United States Patent
Sanchez et al.

(10) Patent No.: US 10,182,271 B1
(45) Date of Patent: Jan. 15, 2019

(54) SYSTEMS AND METHODS FOR PLAYBACK OF SUMMARY MEDIA CONTENT

(71) Applicant: Rovi Guides, Inc., San Jose, CA (US)

(72) Inventors: Mario Sanchez, San Jose, CA (US);
Prabhat Gupta, Uttar Pradesh (IN);
Manik Malhotra, New Delhi (IN);
Phillip Teich, Pasadena, CA (US);
Carla Mack, Los Angeles, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/849,037

(22) Filed: Dec. 20, 2017

(51) Int. Cl.
| | | |
|---|---|---|
| *H04N 5/445* | (2011.01) | |
| *G06F 3/00* | (2006.01) | |
| *G06F 13/00* | (2006.01) | |
| *H04N 21/8549* | (2011.01) | |
| *H04N 21/422* | (2011.01) | |
| *H04N 21/4788* | (2011.01) | |
| *H04N 21/6587* | (2011.01) | |
| *H04N 21/431* | (2011.01) | |
| *H04N 21/472* | (2011.01) | |
| *H04N 21/439* | (2011.01) | |
| *H04N 21/4722* | (2011.01) | |

(52) U.S. Cl.
CPC ... *H04N 21/8549* (2013.01); *H04N 21/42203* (2013.01); *H04N 21/4316* (2013.01); *H04N 21/4394* (2013.01); *H04N 21/4722* (2013.01); *H04N 21/4788* (2013.01); *H04N 21/47217* (2013.01); *H04N 21/6587* (2013.01)

(58) Field of Classification Search
CPC combination set(s) only.
See application file for complete search history.

(56) References Cited

U.S. PATENT DOCUMENTS

| | | |
|---|---|---|
| 6,154,771 A | 11/2000 | Rangan |
| 6,239,794 B1 | 5/2001 | Yuen |
| 6,564,378 B1 | 5/2003 | Satterfield |
| 7,165,098 B1 | 1/2007 | Boyer |
| 7,761,892 B2 | 7/2010 | Ellis |
| 8,046,801 B2 | 10/2011 | Ellis |
| 8,650,599 B2 * | 2/2014 | Shindo .............. G11B 27/034 345/1.1 |
| 9,094,738 B2 * | 7/2015 | Kishore ........... H04N 21/23439 |
| 9,158,435 B2 | 10/2015 | Clark |
| 9,486,698 B2 | 11/2016 | Chung |
| 9,743,119 B2 | 8/2017 | Todd |
| 2002/0174430 A1 | 11/2002 | Ellis |
| 2005/0251827 A1 | 11/2005 | Ellis |
| 2006/0149781 A1 | 7/2006 | Blankinship |
| 2010/0153885 A1 | 6/2010 | Yates |

(Continued)

*Primary Examiner* — Mulugeta Mengesha
(74) *Attorney, Agent, or Firm* — Haley Guiliano LLP

(57) ABSTRACT

Systems and methods are provided for playing a summary of a scene related to a current scene from a media asset being played in a display. This may be accomplished by a media guidance application receiving a command to play a summary of a scene related to the current playback. The media guidance application then determines a scene or scenes related to the current scene and compiles a summary of the related scenes. The media guidance application may also compile summarized content of the current scene to catch a viewer watching summary up to the current scene when the summary is complete. The media guidance application generates for display, on a second display, the summary content.

20 Claims, 15 Drawing Sheets

(56) References Cited

U.S. PATENT DOCUMENTS

| | | |
|---|---|---|
| 2014/0281982 A1 | 9/2014 | Clark |
| 2014/0281989 A1 | 9/2014 | Clark |
| 2016/0057475 A1* | 2/2016 | Liu .................. H04N 21/23418 |
| | | 725/87 |
| 2016/0249116 A1* | 8/2016 | Harb .................. H04N 21/8549 |
| 2016/0261929 A1* | 9/2016 | Lee .................... G06K 9/00724 |

* cited by examiner

SYSTEMS AND METHODS FOR PLAYBACK OF SUMMARY MEDIA CONTENT

BACKGROUND

Users often consume episodic media content or media content related to long story arcs. For example, a user may watch an episode in season five of a show that contains eight seasons. Or a user may watch a movie that is related to a story or novel. While watching such media content, a user may notice something within the current program that the user does not recall. For example, a character in a show may refer to a prior event, item, or other character. With conventional systems, the user may be watching a show when the character references a prior event. If the user does not recall that event, the user would stop the current media, use some resource to locate a scene related event, start the episode that contains the referenced scene, and use some playback user interface to manually search for and navigate to the pertinent scene. Such systems require a large amount of user effort to manually identify a scene and find that scene manually for playback. Furthermore, if the user is watching a show with another viewer, the user cannot watch the related scene without interfering with the viewing experience of the other viewer.

SUMMARY

Accordingly, systems and methods are provided herein for enhancing the user experience by allowing a user to access prior content without interfering with the user's, or other users', consumption of current content. For example, while picture-in-a-picture applications and a plurality of synchronized displays (e.g., a television showing current content and a tablet allowing a user to access prior content) provide a technological environment in which users may simultaneously view different content, these advances still fail to provide users with a seamless viewing experience. For example, to operate a secondary device (e.g., to search for prior content to recall an event), the user must interfere with their consumption of the current content. In fact, the access to so many devices often leads to a degraded user experience as a user is distracted by searching for, and consuming, prior content on a secondary device and therefore misses even more information in the current content. Thus, systems that simply provide multiple displays and/or present different content simultaneously, have created a technological environment that worsens the user's viewing experience. To rectify this problem, the systems and methods disclosed herein alleviate the need for a user to be distracted while searching for prior content to be displayed by automatically determining the prior content that is needed by the user, compiling the content into a viewable form, and compensating for any additional information missed in the current content while the user views the prior content. For example, a media guidance application playing media content to a user receives an indication, e.g., a command, from a user directing the media guidance application to play a summary of a related scene. For example, the media guidance application may be playing an episode of a television show called Mr. Rogers' Neighborhood. In the scene, Mr. Rogers is talking with Chef Brockett and their conversation refers to a prior scene, e.g., a scene where Chef Brockett entered a baking contest. The user watching Mr. Rogers' Neighborhood may not recall watching the baking contest scene and direct the media guidance application to play the baking contest scene. In some embodiments, the media guidance application receives a voice command from the user that indicates the user would like to play a scene related to the current scene. Continuing with the example above, the media guidance application may detect that a user said "Play the scene where Chef Brockett entered a baking contest." In some embodiments, the media guidance application may receive the summary playback command by remote control that directs the media guidance application to present a related scenes user interface for selecting playback of a summary of related scenes. In such an embodiment, the media guidance application may present a list of scenes related to the current scene, characters, or objects for selection from the user.

As noted above, the media guidance application receives a command to play a summary of a scene related to the current playback position, e.g., related to the current scene. The relationship between the related scene the current scene may be based on the events, dialog, objects, characters, or places in the current and related scenes. In some embodiments, the media guidance application may determine that several scenes are related to the current scene and present an interface to the user to select the desired scene. In some embodiments, the media guidance application may combine multiple related scenes to be summarized in the summary playback.

In response to the summary playback command, the media guidance application determines a current playback position in the current scene. Based on, in-part, the current playback position, the media guidance application determines a scene related to the current scene for which the user is requesting a summary. In some embodiments, the media guidance application may detect the characters in the current scene and present a list of other scenes relevant to those characters. Continuing with the above example, the media guidance application may detect a command indicating the user wishes to play a summary of a scene related to Mr. Rogers and Chef Brockett and the media guidance application may locate several candidate scenes related to Mr. Rogers and Chef Brockett. In some embodiments, the media guidance application may use metadata associated with the current scene to detect related scenes. In some embodiments, the media guidance application may also analyze input from the user, such as audio input or tactile input, to determine one or more relevant scenes for summary.

It may be advantageous to provide a system that plays summary content simultaneously with the continued playback of the current scene because a user viewing the summary content is likely to miss some of or all of the continued playback of the current scene. The media guidance application may, therefore, also compile summarized content of the current scene based on the content of the current scene from the current playback position to an estimated summary completion position. Continuing with the example above, the media guidance application may determine that a summary of the scene where Chef Brockett entered a baking contest will contain one minute and fifteen seconds of summary playback. To allow the user to watch the summary of the baking contest, the media guidance application will compile summary content of the portion of the current scene that will play during playback of the summary content.

After the media guidance application determines which scene or scenes it will include in the summarized content, the media guidance application compiles the summarized content. For example, the media guidance application compiles summary content of the related scene or scenes by analyzing the video content of the related scene or scenes and extracting pertinent video frames. The media guidance application may use machine vision algorithms to determine a frame when a new character enters the related scene. The media guidance application marks the identified frame, and in some cases a predetermined number of frames before the character entered the scene and/or a predetermined number of frames after the character entered the scene, for inclusion in the summarized content. Furthermore, the media guidance application may analyze motion vectors present in the digital representation of a scene, e.g., within an MPEG stream, to identify frames associated with a large amount of image motion suggesting large visual changes in the scene. The media guidance application may mark the frames with a large amount of image motion for inclusion in the summarized content. Still further, the media guidance application may identify key portions of an image frame, such as the portion of the image centered near a rule of thirds intersection points, are in focus. In one embodiment, the media guidance application extracts an A×B portion (e.g., 8 pixel by 8 pixel image block from a frame) coincident to a focal point and calculates the local maximum frequency of the image to make a determination whether the frame is in focus. Using focus information, the media guidance application may mark frames for inclusion based on a change in focus information. Still other examples may locate a first frame of the related scene or scenes and track when a focal point of the scene changes according to a pre-determined threshold to identify key frames for inclusion in the summarized content. In some embodiments, the media guidance application may rely on metadata correlated with the related scene or scenes to identify the key frames which are marked for inclusion in the summarized playback content. The media guidance application then compiles a collection of the marked frames as the summarized playback content.

After, the media guidance application compiles the summarized content, the media guidance application displays the summarized content. In some embodiments, the media guidance application displays the summarized content on a second display simultaneous with continuing playback of the current scene on a first display. For example, the media guidance application may open a picture-in-picture (PIP) window for display of the summary content while continuing playback of the current scene. In such an embodiment, it may be advantageous to stream sound related to the summarized content to a secondary audio device, e.g., a mobile device capable of delivering audio, wireless speakers, wireless headphones, or a secondary audio path of a home theater system. In some embodiments, the media guidance application may stream the summary playback to a secondary device while continuing playback of the current scene on a primary device. For example, the user may request that the media guidance application stream the summary playback to a mobile device. In some embodiments, the media guidance application may accept commands to send the continued playback of the current scene to a second device, e.g., a mobile device, while the media guidance application displays the summarized content on a primary device.

In some embodiments, the media guidance application will determine the related scene or scenes using information from the current scene. For example, the media guidance application may determine a current playback position of the current scene in a media asset being viewed in the first display. The media guidance application identifies information associated with the current scene based on the current playback position. For example, the media guidance application may identify that a character in a scene is talking to a second character about events that happened in an earlier point of the show or a related show. The media guidance application may compare the identifying information with other information associated with a plurality of relevant scenes. For example, the media guidance application may use the topics discussed by characters to search a catalogue of scenes from the current episode or other episodes from the current show. The media guidance application may then determine a related scene from other scenes of the show based on that comparison. As discussed above, the media guidance application compiles summarized playback content, wherein the summarized playback content is associated with the current scene and the related scene.

In some embodiments, the media guidance application includes content from the current scene in the summarized playback content. For example, the media guidance application may determine a projected summarized playback end point in the current scene based on the length of the one or more portions of the related scene or scenes extracted for inclusion in the summarized playback content and the current playback position. For example, the media guidance application may determine that the summarized playback end point is one minute and fifteen seconds from the current playback position. This determination could be based on the length of the summary content from the related scene or scenes that the media guidance application determined it will play during the summary. Because the user will miss one minute and fifteen seconds of the current scene, assuming the summarized content is played simultaneous, i.e., in parallel, with the continued playback of the current scene, the media guidance application may determine that one or more portions of the current scene should be added to summarize upcoming content from the current scene. For example, the media guidance application may determine that fifteen seconds of additional content from the current scene would summarize the next one minute and thirty seconds of the current scene and determine that fifteen seconds of additional content should be included in the summarized content. Thus, the media guidance application extracts one or more portions of the current scene for inclusion in the summarized playback content, the one or more portions of the current scene occurring after the current playback position and before the projected summarized playback end point such that the summarized playback content includes information to summarize portions of the current scene that would play during display of the summarized playback. The media guidance application generates for display in a second display, simultaneous with continued display of the current scene in the first display, the summarized playback content.

In some embodiments, the media guidance application may use dialogue extracted from the current scene to determine the related scene or scenes. For example, the media guidance application may extract dialogue associated with the current scene and generates a plurality of key phrases from the dialogue associated with the current scene. For example, the media guidance application may use natural language processing to extract objects, names, and places the characters are speaking about in the current scene. In some embodiments, the media guidance application uses audio text recognition to extract dialogue associated with the current scene. In some embodiments, the media guidance application accesses a data source containing dialogue associated with the current scene. The data source may be located either locally with the media guidance application or at a remote server. The media guidance application may generate a plurality of relationship scores between the current scene and the plurality of relevant scenes based on the key phrases and the information associated with the plurality of relevant scenes. Using the example from above, the media guidance application may identify several relevant scenes containing Chef Brockett and Mr. Rogers. Using the dialogue of the current scene, the media guidance application may determine that "cake" and "contest" are key phrases and generate a plurality of relationship scores for use using containing Chef Brockett and Mr. Rogers. The relationship score reflecting the presence of related topics and dialogue as to the key phrases. The media guidance application may then identify the related scene from the plurality of relevant scenes based on the plurality of relationship scores.

In some embodiments, the media guidance application identifies a second display from a plurality of displays as an available display for the summarized content. The media guidance application may also determine a complementary audio level to apply to the second display so that the audio level of the summarized content minimizes audio disruptions to the continued playback of the current scene on the first display. The media guidance application may direct the second display to playback the summary content simultaneous with continued display of the current scene in the first display and direct an audio system to playback audio associated with the summary content at the complementary audio level.

In some embodiments, the media guidance application monitors an audio input device to receive commands from a user. Once the media guidance application receives audio input indicating a summary command, the media guidance application would then determine the related scene. For example, the media guidance application may identify a plurality of candidate scenes as potential matches to serve as the related scene or scenes for summarized playback. The media guidance application may then present a listing of the plurality of candidate scenes to the user and receive a selection of one or more of the plurality of candidate scenes as the related scene. In some embodiments, the media guidance application provides a weighting score to each of the plurality of candidate scenes based on a comparison between the identifying information and the information associated with that candidate scene. For example, if three scenes are potential scenes related to a cake contest with Mr. Rogers and Chef Brockett, the media guidance application may determine to give a weighting score to each scene and present the list of candidate scenes in an order based on their relative weights.

In some embodiments, the media guidance application determines the related scene based on visual data within the current scene. The media guidance application may determine a portion of the current scene as an area of interest and extract an object or objects from that portion of the current scene. The media guidance application then generates a plurality of relationship scores as between the current scene and the plurality of relevant scenes based on information associated with the object or objects and information associated with the plurality of relevant scenes. The media guidance application may identify a related scene or scenes from the plurality of relevant scenes based on the plurality of relationship scores. Using the example above, the media guidance application may identify Mr. Rogers' face, Chef Brockett's face, and a cake as objects of interest in the current scene. Using that information, the media guidance application may score relevant scenes based on the presence of Mr. Rogers' face, Chef Brockett's face, and/or cake. Using those scores, the media guidance application may determine the scene or scenes related to the current scene to use for summarized playback.

In some embodiments, the media guidance application determines a more than one related scene from the plurality of relevant scenes. The media guidance application extracts one or more portions of each related scene for inclusion in the summarized playback content and combines these portions in a set of scenes for summarized playback content.

In some embodiments, the media guidance application displays a community interface in a second display. For example, a user may desire a mechanism to interact with social networks, web portals, websites, blogs, forums, etc., regarding the content the user is watching. To enable this interface, the media guidance application may receive information from a remote server for display in the community interface and receives input from a user using the community interface. The media guidance application may then transmit the user's input from the community interface to a remote server.

In some embodiments, the media guidance application may detect that playback of summary content is requested for content not available locally from the media guidance application. For example, the media guidance application may receive, at a second playback position, a second summary command. The media guidance application may identify a scene related to a second scene at the second playback position and determine that the related content is not available for summarized playback. The media guidance application may then request a remote summary of the second related scene from a remote server. For example, the media guidance application may request that a remote server compile the summarized playback content for display. Alternatively, the media guidance application may request a textual summary of the related scene for display on the second display. The media guidance application may then display the remote summary on the second display simultaneous with the continued display of the current scene in the first display.

In some embodiments, the media guidance application may determine that a related scene is not available and make use of metadata to identify services that can provide the related scene. The media guidance application may issue a request for the related scene or scenes, or portions of the related scene or scenes, from a service and receive content for playback from that service. In some embodiments, the media guidance application may tag episodes or media content based on the determined probabilities of relatedness. The media guidance application may further distribute the probabilities of relatedness to a central server, remote server, or peer media guidance applications.

In some embodiments, the media guidance application allows a viewer to access content from an earlier episode of a program, or an otherwise related episode of a current program, while the current program is in progress. For example, the media guidance application may open in a smaller, secondary display, e.g., a display that would appear in the upper right-hand side of the primary screen. Because most viewers consume media on the go, the media guidance application may provide this feature not only on in-home televisions, laptops, or tablets, but also on smartphones as well and other mobile devices as well. In one embodiment, e.g., on a smartphone, the media guidance application may utilize a portion of the primary screen for the secondary display, e.g., the top ⅓. Alternatively, the media guidance application may utilize a second device as the secondary display while utilizing a first device as the primary display, e.g., the primary display may be on a television while the secondary display may be on a smartphone or table. In response to receiving a command, the media guidance application may determine that it must replay an episode, or summary of an episode, in the secondary display. For example, the media guidance application may play episode eight of season six of HBO's series Game of Thrones. During playback, a character (e.g., "Arya Stark") in the show mentions the brutal murder of her mother which took place at a wedding during an earlier episode. The media guidance application may receive a command from a user, e.g., "repeat the scene where Arya's mother was killed at a wedding." The media guidance application may open a secondary display in the upper right-hand corner of the primary display and repeat the "Red Wedding" scene. During this time, the media guidance application may pause or continue playback of the current episode in accordance with embodiments of the invention.

In some embodiments, the media guidance application may also give viewers options to watch the entire episode containing a related scene or even watch an earlier episode starting from the scene identified as the related scene. If media guidance application receives input indicating a desire from a viewer to watch the entire episode or the episode starting from the related scene, the media guidance application may play the requested content in the primary display. After the related content has played in its entirety, the media guidance application may prompt the user to continue playback of the current scene on the primary display. In some embodiments, the media guidance application may give the user the option to return to the beginning of an episode containing the current scene or return to the point at which the viewer left the current scene.

In some embodiments, it may be advantageous for the media guidance application to provide a display control interface. The media guidance application may use the display control interface to provide user interface elements directing the media guidance application which displays should serve as the primary and secondary displays. For example, the embodiments above have been described as showing scenes related to a current scene in a secondary, smaller display with the current scene holding position in the primary display. The user may desire to switch the related scene to the primary display and the current scene to the secondary scene. Therefore, the media guidance application may provide user interface elements that allow a user to direct the media guidance application to play the current scene in a secondary display and the related scene, or other content, in the primary display.

In some embodiments, the media guidance application may use the secondary display to provide additional functions. For example, the media guidance application may display metadata associated with the current scene including program descriptions, current episode descriptions, biographies, reviews, and other information that is related to the characters in the scene. The media guidance application may show reminders in the second display including personal calendar events, family/group calendar events, profession calendar events, tasks list, email messages, text messages including short message service ("SMS") and multimedia messaging service ("MMS"), and scheduled programming. The media guidance application may use the secondary display to zoom in on specific portion of a scene, an individual, or item (e.g., weapon, car, sports game play, etc.). In some embodiments, a three-dimensional ("3D") view may be provided with the secondary display for example if the secondary display is associated with a device with three-dimensional playback capability. The media guidance application may provide textual responses to a user's questions, e.g., voice activated questions, in the secondary display using a remote data source. For example, the media guidance application may to voice request about the current video content, e.g., "who is the actor playing Jim Rockford" or "who is the actor playing Jon Snow," by obtaining information related to the user's question and displaying said information in the secondary display. The media guidance application may also play advertising in the secondary display during playback of the current scene. The media guidance application may also use the secondary display to provide an interface for a user to engage with people in the user's social media circles.

In some embodiments, it is advantageous for the media guidance application to display a list of options to the user showing multiple candidate related scenes for playback or summarized playback. The media guidance application may weigh each candidate related scene and sort the options. In some embodiments, the media guidance application may present one of the candidate related scenes as a default scene to be judged as the most relevant snippet and, for example, the media guidance application may begin playback of the default scene if it receives no additional input from the user.

In some embodiments, the media guidance application may be able to determine whether a related scene is available for playback or summarized playback in the secondary display. If the related scene is not available, the media guidance application may populate the secondary screen with information from a remote data source relevant to the related scene. For example, the media guidance application may display pertinent video clips (e.g., YouTube clip), short format content (e.g., tweets from Twitter or information from IMDB or Rotten Tomatoes).

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Accordingly, systems and methods are provided herein for controlling playback, in a second display, of a summary of a scene related to a current scene in parallel with playback of the current scene in a first display. A media guidance application playing media content to a user receives an indication from a user directing the media guidance application to play a summary of a related scene. For example, the media guidance application may be playing an episode of a series to a user. As an example, the media guidance application may play back an episode of Mr. Rogers' Neighborhood where Mr. Rogers is talking with Chef Brockett. During the playback, Mr. Rogers and Chef Brockett may refer to a prior scene, e.g., the scene where Chef Brockett entered a baking contest. The user watching Mr. Rogers' Neighborhood may not recall watching the baking contest scene and direct the media guidance application to play the baking contest scene. In some embodiments, the media guidance application receives a voice command from the user that indicates the user would like to play a scene related to the current scene. Continuing with the example above, the media guidance application may detect that a user said "Play the scene where Chef Brockett entered a baking contest." In some embodiments, the media guidance application may receive a command by remote control that directs the media guidance application to present a related scenes user interface for selecting playback of a summary of related scenes. In such an embodiment, the media guidance application may present a list of scenes related to the current scene, characters, or objects for selection from the user.

The systems and methods described herein may be implemented by a media guidance application made available on a user equipment device. The media guidance application may receive a command during playback of a media asset that indicates the media guidance application should play a summary of a related scene or scenes, i.e., "summarized playback". In some embodiments, the media guidance application will playback a summary of a scene or scenes related to a current scene on a secondary display without suspending playback of the current scene being played in the primary display. In other embodiments, the media guidance application will suspend playback of the current scene in the primary display while playing a summary of related scenes in a secondary display. In still further embodiments, the media guidance application provides a user with the option of continuing playback of the current scene on a primary display while playing a summary of related scenes in a secondary display.

Figure 1:
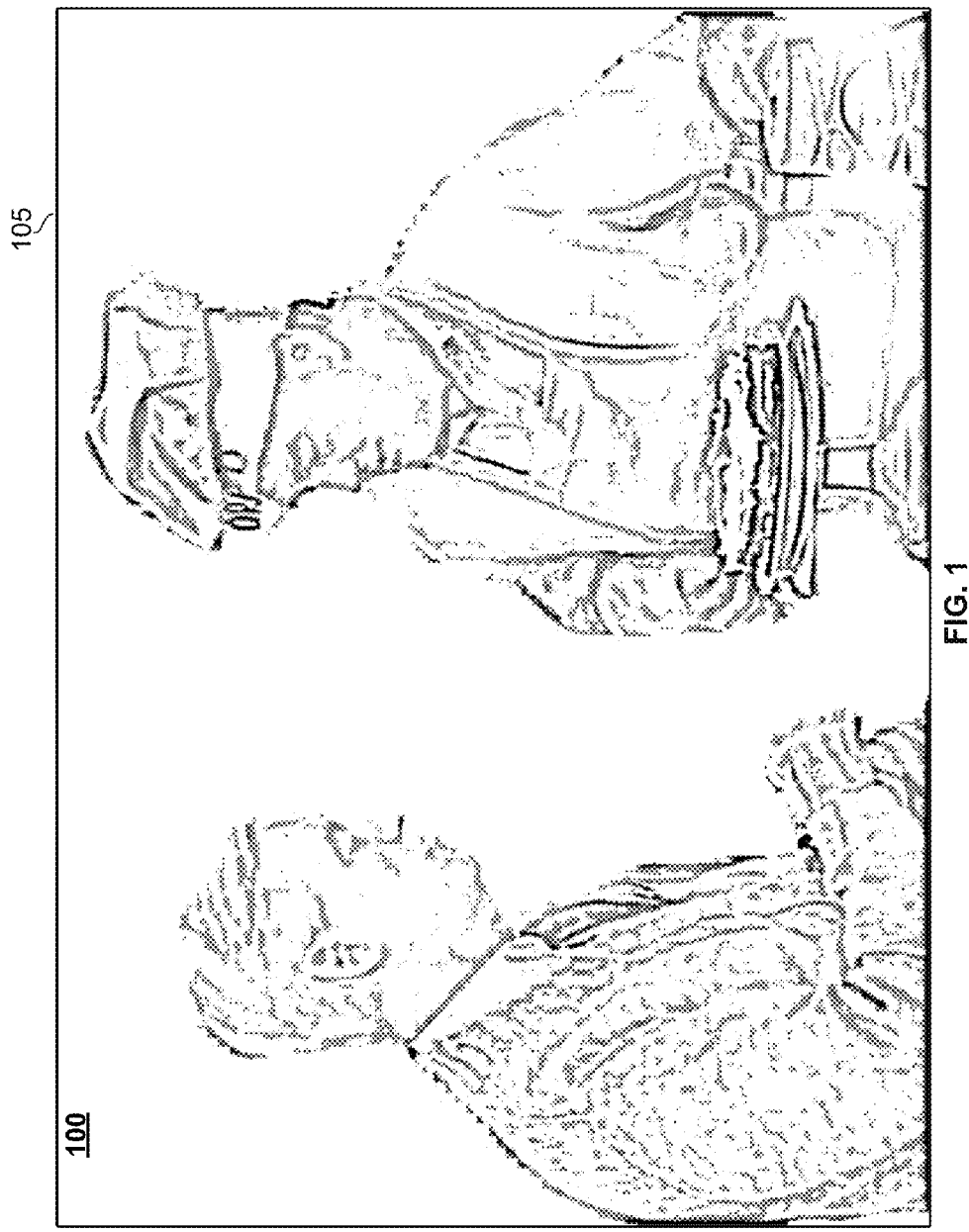
FIG. 1 depicts an illustrative embodiment of a display screen that may be used to control playback, in a second display, of a summary of a scene related to a current scene.
Figure 2:
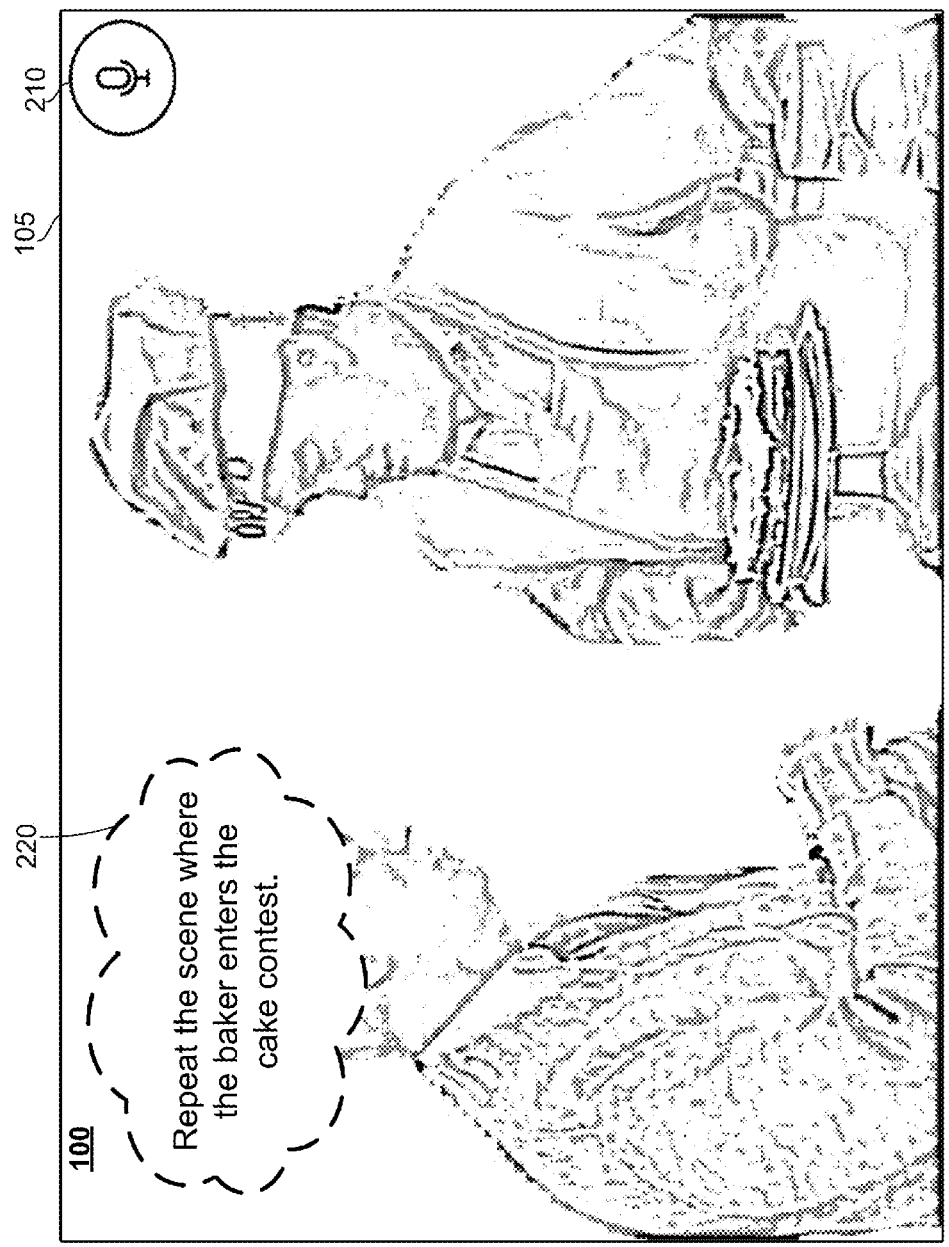
FIG. 2 depicts an illustrative embodiment of a display screen that may be used to control playback, in a second display, of a summary of a scene related to a current scene.

FIGS. 1-2 depicts an illustrative embodiment of a display screen that may be used to control playback, in a second display, of a summary of a scene related to a current scene. The functionality of user equipment, control circuitry, and the media guidance application is described in further detail with respect to FIGS. 6-9.

In FIG. 1, the media guidance application 100 is generating playback of a media asset in a primary display 105. For example, the media guidance applicationA00 may be playing an episode of a television show called "Mr. Rogers' Neighborhood." In the scene Mr. Rogers is speaking with Chef Brockett about a baking contest in which Chef Brockett participated from a prior episode. During playback, the media guidance application 100 may receive a command from a user, e.g., a viewer watching playback, indicating the user would like the media guidance application 100 to play content related to the current scene. For example, the media guidance application 100 may receive a voice command 220 from a user. Continuing with the example of "Mr. Roger's Neighborhood," the media guidance application 100 may receive a command from the user to play a scene from Mr. Rogers' Neighborhood where Chef Brockett entered a baking content. In some embodiments, the media guidance application 100 may receive commands through an onscreen interactive guide. In some embodiments, the media guidance application 100 may monitor audio using an audio input subsystem, e.g., a microphone, and determine when a key phrase of phrases are invoked to issue a commend such as voice command 220 as depicted in FIG. 2. In still other embodiments, the media guidance application 100 may provide an interface element 210 that informs the media guidance application 100 that it should begin monitoring audio for an audio command. In one example, the interface element 210 may be a command button on a remote control or on the surface of a mobile device that provides commands to the media guidance application 100, while in another example the interface element 210 may be an audio phrase recognized by the media guidance application 100 to begin receiving commands.

The media guidance application 100 receives a command to play a summary of a scene related to the current playback position, e.g., related to the current scene. The relationship between the related scene the current scene may be based on the events, dialog, objects, characters, or places in the current and related scenes. In some embodiments, the media guidance application 100 may determine that many scenes are related to the current scene and present an interface to the user to select the desired scene. In some embodiments, the media guidance application 100 may combine multiple related scenes for summary playback. In response to the summarized playback command, the media guidance application 100 determines a current playback position of the current scene. Using, in-part, the current playback position, the media guidance application 100 determines a scene related to the current scene for which the user is requesting a summary. As described above, the media guidance application 100 may detect a command indicating the user wishes to play a summary of scene related to Mr. Rogers and Chef Brockett. In some embodiments, the media guidance application 100 may detect the characters in the current scene and present a list of other scenes relevant to the current characters. In some embodiments, the media guidance application 100 may use metadata associated with the current scene to detect related scenes. In some embodiments, the media guidance application 100 may analyze input from the user, audio or tactile input, to determine one or more relevant scenes for summary.

After determining which scene or scenes for which the user is requesting summary playback, the media guidance application 100 compiles summarized content of the scene related to the current scene. In some embodiments, the media guidance application 100 may determine that playback of the summary content will occur simultaneous with continued playback of the current scene, because a user viewing the summary content is likely to miss some or all of the continued playback of the current scene. Thus, the media guidance application 100 may also compile summarized content of the current scene based on the content of the current scene from the current playback position to an estimated summary completion position. Continuing with the example above, the media guidance application 100 may determine that a summary of the scene where Chef Brockett enters a baking contest will contain one minute and fifteen seconds of summary playback. To allow the user to watch the summary of the baking content, the media guidance application 100 will compile summary content of the portion of the current scene that will play during playback of the summary content. After, the media guidance application 100 compiles the summarized content, the media guidance application 100 displays the summarized content. In some embodiments, the media guidance application 100 displays the summarized content on a second display simultaneous with continuing playback of the current scene on a first display. For example, the media guidance application 100 may open a picture-in-picture (PIP) window for display of the summary content while continuing playback of the current scene, such as depicted with reference to FIG. 3. Alternatively, the media guidance application 100 may stream the summary playback to a secondary device while continuing playback of the current scene on a primary device such as depicted in FIG. 4.

Figure 3:
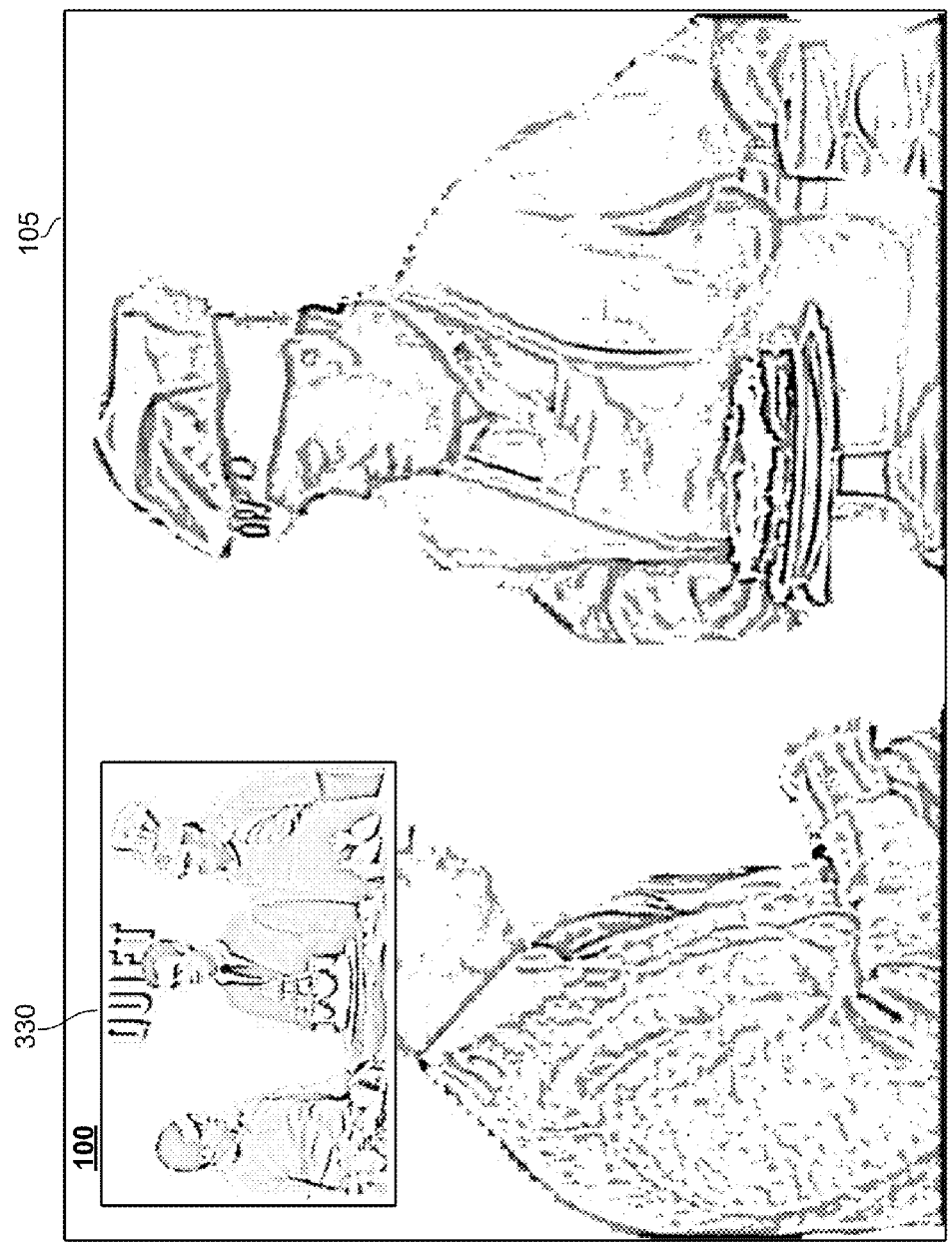
FIG. 3 depicts an illustrative embodiment of a display screen that may be used to control playback, in a second display, of a summary of a scene related to a current scene.

FIG. 3 depicts an illustrative embodiment of a display screen that may be used to control playback, in a second display, of a summary of a scene related to a current scene. After the media guidance application 100 has compiled the summarized content, the media guidance application 100 displays the summarized content. In FIG. 3, the media guidance application 100 has opened a secondary display 330 over top a primary display 105 playing a media asset. The media guidance application 100 uses the secondary display 330 to playback the summarized content. As discussed herein, some embodiments of the media guidance application 100 playback summarized content in the secondary display 330 at the same time as continuing playback of the current scene in the primary display. In still other embodiments, the media guidance application 100 will suspend playback of the current scene in the primary display while playing the summarized content in the secondary display 330. Still further embodiments provide a media guidance application 100 that provides an option to viewers of whether to continue to suspend playback of the current scene during summarized playback. And in some embodiments, the media guidance application 100 provides viewers with control of switching the summarized playback from the secondary display 330 to a primary display. In such an embodiment, it may be further advantageous to stream sound related to the summarized content to a secondary audio device, e.g., a mobile device capable of delivering audio, wireless speakers, wireless headphones, or a secondary audio path of a home theater system.

Figure 4:
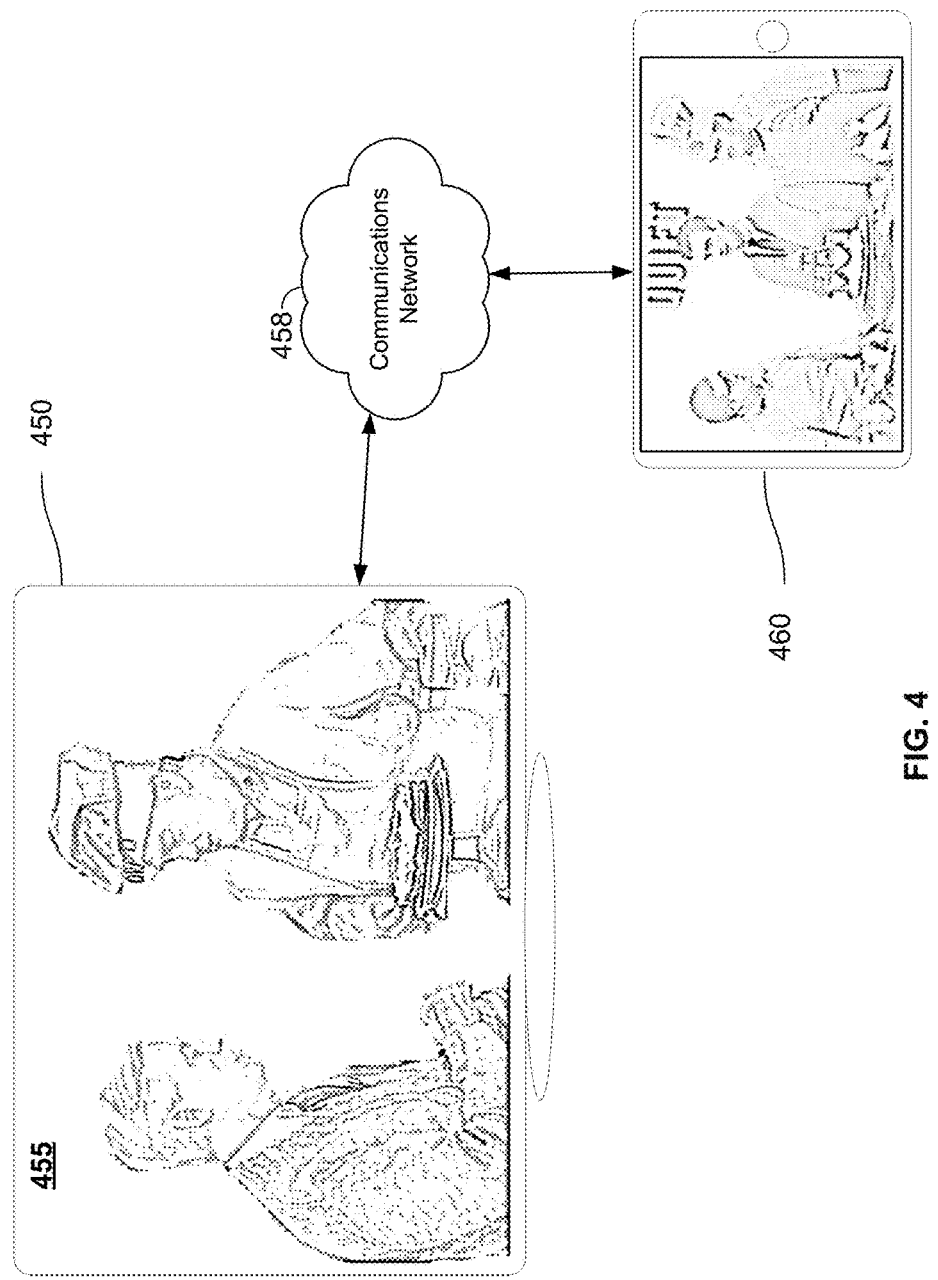
FIG. 4 depicts an illustrative embodiment of a display screen that may be used to control playback, in a second display, of a summary of a scene related to a current scene

FIG. 4 depicts an illustrative embodiment of a display screen that may be used to control playback of summary content in a second display. In FIG. 4, a primary display 150 is associated with a media guidance application 455 controlling playback of a media asset on the primary display 150. The media guidance application 455 is operably coupled with a secondary device 460, e.g., a mobile device such as a smartphone, tablet, or laptop, through a communications network 458. The media guidance application 455 may receive a request from a user to directed the secondary device 460 to playback summarized content of related scenes. In another embodiment, the media guidance application 455 may accept commands to direct the secondary device 460 to continue playback of the current scene while the primary device 450 will playback the summarized content.

In some embodiments, the media guidance application 100 will determine the related scene or scenes using information from the current scene. For example, the media guidance application 100 may determine a current playback position of the current scene in a media asset being viewed in the first display. The media guidance application 100 identifies information associated with the current scene based on the current playback position. For example, the media guidance application 100 may identify that a character in a scene is talking to a second character about events that happened in an earlier point of the show or a related show. The media guidance application 100 may compare the identifying information with other information associated with a plurality of relevant scenes. For example, the media guidance application 100 may use the topics discussed by characters to search a catalogue of scenes from the current episode or other episodes from the current show. The media guidance application 100 may then determine a related scene from other scenes of the show based on that comparison. As discussed above, the media guidance application 100 compiles summarized playback content, wherein the summarized playback content is associated with the current scene and the related scene.

In some embodiments, the media guidance application 100 includes content from the current scene in the summarized playback content. For example, the media guidance application 100 may determine a projected summarized playback end point in the current scene based on the length of the one or more portions of the related scene or scenes extracted for inclusion in the summarized playback content and the current playback position. For example, the media guidance application 100 may determine that the summarized playback end point is one minute and fifteen seconds from the current playback position. This would be based on the length of the summary content from the related scene or scenes that the media guidance application 100 determined it will play during the summary. Because the user will miss one minute and fifteen seconds of the current scene, assuming the summarized content is played simultaneously, i.e., in parallel with the continued playback of the current scene, the media guidance application 100 may determine that one or more portions of the current scene should be added to summarize upcoming content from the current scene. For example, the media guidance application 100 may determine that fifteen seconds of additional content from the current scene would summarize the next one minute and thirty seconds of the current scene and determine that content should be included in the summarized content. Thus, the media guidance application 100 extracts one or more portions of the current scene for inclusion in the summarized playback content, the one or more portions of the current scene occurring after the current playback position and before the projected summarized playback end point such that the summarized playback content includes information to summarize portions of the current scene that would play during display of the summarized playback. The media guidance application 100 displays in a second display, simultaneous with continued display of the current scene in the first display, the summarized playback content.

In some embodiments, the media guidance application 100 may use dialogue extracted from the current scene to determine the related scene or scenes. For example, the media guidance application 100 may extract dialogue associated with the current scene and generates a plurality of key phrases from the dialogue associated with the current scene. For example, the media guidance application 100 may use natural language processing to extract objects, names, and places the characters are speaking about in the current scene. In some embodiments, the media guidance application 100 uses audio text recognition to extract dialogue associated with the current scene. In some embodiments, the media guidance application 100 accesses a data source containing dialogue associated with the current scene. The data source may be either located locally with the media guidance application 100 or on a remote server. The media guidance application 100 may generate a plurality of relationship scores between the current scene and the plurality of relevant scenes based on the key phrases and the information associated with the plurality of relevant scenes. Using the example from above, the media guidance application 100 may identify several relevant scenes containing Chef Brockett and Mr. Rogers. Using the dialogue of the current scene, the media guidance application 100 may determine that "cake" and "contest" are key phrases and generate a plurality of relationship scores for use using containing Chef Brockett and Mr. Rogers. The relationship score reflecting the presence of related topics and dialogue as to the key phrases. The media guidance application 100 may then identify the related scene from the plurality of relevant scenes based on the plurality of relationship scores.

In some embodiments, the media guidance application 100 identifies a secondary display from a plurality of displays as an available display for the summarized content. The media guidance application 100 may also determine a complementary audio level to apply to the second display so that the audio level of the summarized content minimizes audio disruptions to the continued playback of the current scene on the first display. The media guidance application 100 may direct the second display to playback the summary content simultaneous with continued display of the current scene in the first display and direct an audio system to playback audio associated with the summary content at the complementary audio level.

In some embodiments, the media guidance application 100 monitors an audio input device to receive commands from a user. Once the media guidance application 100 receives audio input indicating a summary command, the media guidance application 100 would then determine the related scene. For example, the media guidance application 100 may receive an audio command 220 as depicted in FIG. 2. In response to that commande, the media guidance application 100 may identify a plurality of candidate scenes as potential matches to serve as the related scene or scenes for summarized playback. The media guidance application 100 may then present a listing of the plurality of candidate scenes to the user and receive a selection of one or more of the plurality of candidate scenes as the related scene. In some embodiments, the media guidance application 100 provides a weighting score to each of the plurality of candidate scenes based on the comparison between the identifying information and the information associated with that candidate scene. For example, if three scenes are potential scenes related to a cake contest with Mr. Rogers and Chef Brockett, the media guidance application 100 may determine to give a weighting score to each scene and present the list of candidate scenes in an order based on their relative weights.

In some embodiments, the media guidance application 100 determines the related scene based on visual data within the current scene. The media guidance application 100 may determine a portion of the current scene as an area of interest and extract an object or objects from that portion of the current scene. The media guidance application 100 then generates a plurality of relationship scores as between the current scene and the plurality of relevant scenes based on information associated with the object or objects and information associated with the plurality of relevant scenes. The media guidance application 100 may identify a related scene or scenes from the plurality of relevant scenes based on the plurality of relationship scores. Using the example above, the media guidance application 100 may identify Mr. Rogers' face, Chef Brockett's face, and a cake as objects of interest in the current scene. Using that information, the media guidance application 100 may score relevant scenes based on the presence of Mr. Rogers' face, Chef Brockett's face, and/or cake. Using those scores, the media guidance application 100 may determine the scene or scenes related to the current scene to use for summarized playback.

In some embodiments, the media guidance application 100 determines a more than one related scene from the plurality of relevant scenes. The media guidance application 100 extracts one or more portions of each related scene for inclusion in the summarized playback content and combines these portions in a set of scenes for summarized playback content.

Figure 5:
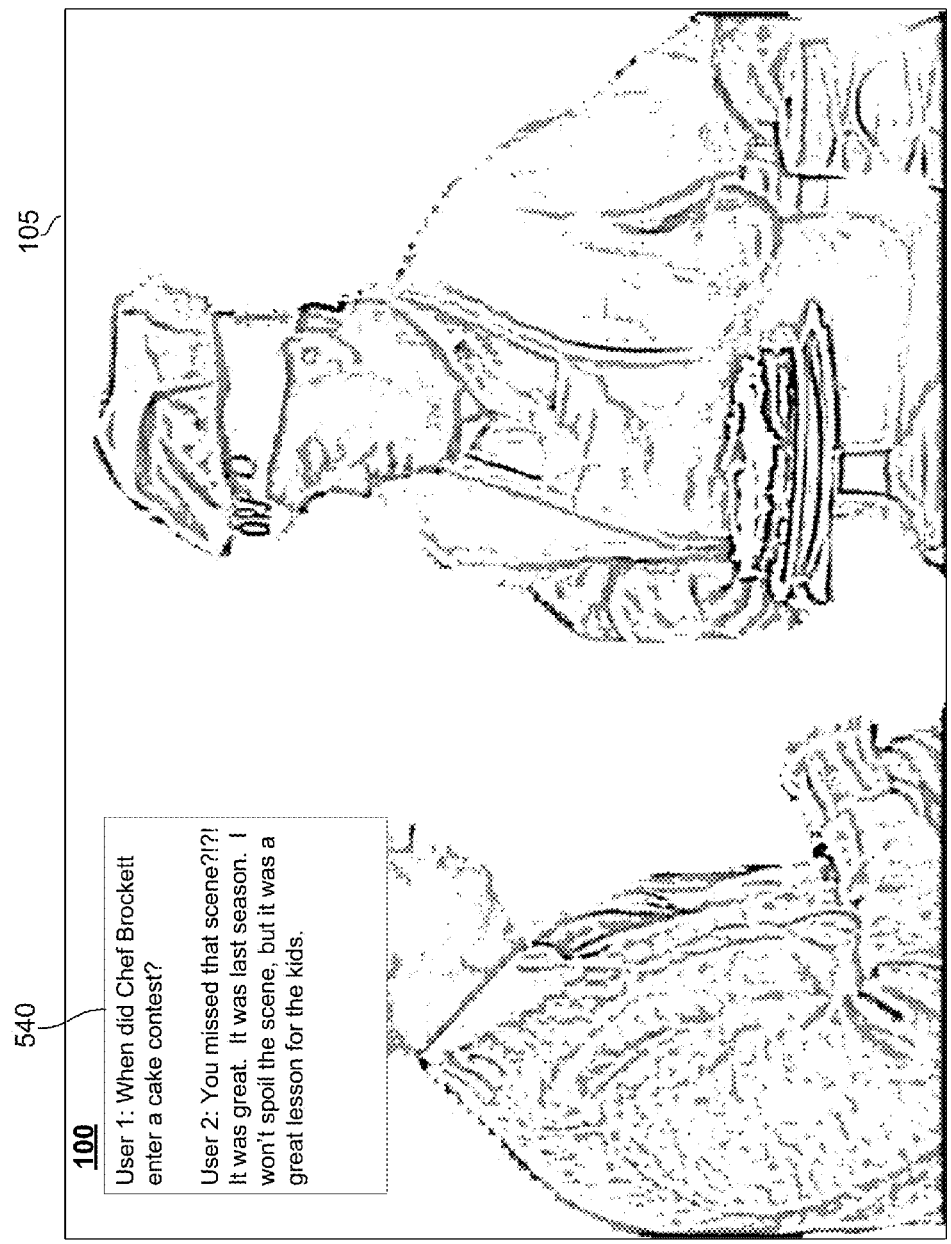
FIG. 5 depicts an illustrative embodiment of a display screen that may be used to control a community interface, in a second display, in parallel with playback of the current scene in a first display.

FIG. 5 depicts an illustrative embodiment of a display screen that may be used to control a community interface, in a second display, in parallel with playback of the current scene in a first display. For example, the media guidance application 100 may display a community interface in a secondary display 540. The media guidance application 100 may use the community interface to provide a user with a mechanism to interact with social networks, web portals, websites, blogs, forums, etc., regarding the content the user is watching. To enable this interface, the media guidance application 100 may receive information from a remote server for display in the community interface and receives input from a user using the community interface. The media guidance application 100 may then transmit the user's input from the community interface to a remote server.

In some embodiments, the media guidance application 100 may detect that playback of summary content is requested for content not available locally from the media guidance application 100. For example, the media guidance application 100 may receive, at a second playback position, a second summary command. The media guidance application 100 may identify a scene related to a second scene at the second playback position and determine that the related content is not available for summarized playback. The media guidance application 100 may then request a remote summary of the second related scene from a remote server. For example, the media guidance application 100 may request that a remote server compile the summarized playback content for display. Alternatively, the media guidance application 100 may request a textual summary of the related scene for display on the second display. The media guidance application 100 may then display the remote summary on the second display simultaneous with the continued display of the current scene in the first display.

In some embodiments, the media guidance application 100 may determine that a related scene is not available and make use of metadata to identify services that can provide the related scene. The media guidance application 100 may issue a request for the related scene or scenes, or portions of the related scene or scenes, from a service and receive content for playback from that service. In some embodiments, the media guidance application 100 may tag episodes or media content based on the determined probabilities of relatedness. The media guidance application 100 may further distribute the probabilities of relatedness to a central server, remote server, or peer media guidance application 100s.

In some embodiments, the media guidance application 100 allows a viewer to access content from an earlier episode of a program, or an otherwise related episode of a current program, while the current program is in progress. For example, the media guidance application 100 may open in a smaller, secondary display, e.g., a display that would appear in the upper right-hand side of the primary screen. Because most viewers consume media on the go, the media guidance application 100 may provide this feature not only on in-home televisions, laptops, or tablets, but also on smartphones as well and other mobile devices as well. In one embodiment, e.g., on a smartphone, the media guidance application 100 may utilize a portion of the primary screen for the secondary display, e.g., the top ⅓. Alternatively, the media guidance application 100 may utilize a second device as the secondary display while utilizing a first device as the primary display, e.g., the primary display may be on a television while the secondary display may be on a smartphone or table. In response to receiving a command, the media guidance application 100 may determine that it must replay an episode, or summary of an episode, in the secondary display. For example, the media guidance application 100 may play episode eight of season six of HBO's series Game of Thrones. During playback, a character (e.g., "Arya Stark") in the show mentions the brutal murder of her mother which took place at a wedding during an earlier episode. The media guidance application 100 may receive a command from a user, e.g., "repeat the scene where Arya's mother was killed at a wedding." The media guidance application 100 may open a secondary display in the upper right-hand corner of the primary display and repeat the "Red Wedding" scene. During this time, the media guidance application 100 may pause or continue playback of the current episode in accordance with embodiments of the invention.

In some embodiments, the media guidance application 100 may also give viewers options to watch the entire episode containing a related scene or even watch an earlier episode starting from the scene identified as the related scene. If media guidance application 100 receives input indicating a desire from a viewer to watch the entire episode or the episode starting from the related scene, the media guidance application 100 may play the requested content in the primary display. After the related content has played in its entirety, the media guidance application 100 may prompt the user to continue playback of the current scene on the primary display. In some embodiments, the media guidance application 100 may give the user the option to return to the beginning of an episode containing the current scene or return to the point at which the viewer left the current scene.

In some embodiments, it may be advantageous for the media guidance application 100 to provide a display control interface. The media guidance application 100 may use the display control interface to provide user interface elements directing the media guidance application 100 which displays should serve as the primary and secondary displays. For example, the embodiments above have been described as showing scenes related to a current scene in a secondary, smaller display with the current scene holding position in the primary display. The user may desire to switch the related scene to the primary display and the current scene to the secondary scene. Therefore, the media guidance application 100 may provide user interface elements that allow a user to direct the media guidance application 100 to play the current scene in a secondary display and the related scene, or other content, in the primary display.

In some embodiments, the media guidance application 100 may use the secondary display to provide additional functions. For example, the media guidance application 100 may display metadata associated with the current scene including program descriptions, current episode descriptions, biographies, reviews, and other information that is related to the characters in the scene. The media guidance application 100 may show reminders in the second display including personal calendar events, family/group calendar events, profession calendar events, tasks list, email messages, text messages including short message service ("SMS") and multimedia messaging service ("MMS"), and scheduled programming. The media guidance application 100 may use the secondary display to zoom in on specific portion of a scene, an individual, or item (e.g., weapon, car, sports game play, etc.). In some embodiments, a three dimensional ("3D") view may be provided with the secondary display for example if the secondary display is associated with a device with three-dimensional playback capability. The media guidance application 100 may provide textual responses to a user's questions, e.g., voice activated questions, in the secondary display using a remote data source. For example, the media guidance application 100 may to voice request about the current video content, e.g., "who is the actor playing Jim Rockford" or "who is the actor playing Jon Snow," by obtaining information related to the user's question and displaying said information in the secondary display. The media guidance application 100 may also play advertising in the secondary display during playback of the current scene. The media guidance application 100 may also use the secondary display to provide an interface for a user to engage with people in the user's social media circles.

In some embodiments, it is advantageous for the media guidance application 100 to display a list of options to the user showing multiple candidate related scenes for playback or summarized playback. The media guidance application 100 may weigh each candidate related scene and sort the options. In some embodiments, the media guidance application 100 may present one of the candidate related scenes as a default scene judged to be the most relevant snippet and, for example, the media guidance application 100 may begin playback of the default scene if it receives no additional input from the user.

In some embodiments, the media guidance application 100 may be able to determine whether a related scene is available for playback or summarized playback in the secondary display. If the related scene is not available, the media guidance application 100 may populate the secondary screen with information from a remote data source relevant to the related scene. For example, the media guidance application 100 may display pertinent video clips (e.g., YouTube clip), short format content (e.g., tweets from Twitter or information from IMDB or Rotten Tomatoes).

As noted above, the media guidance application described herein controls playback, in a second display, of a summary of a scene related to a current scene in a first display of a media asset. The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 6:
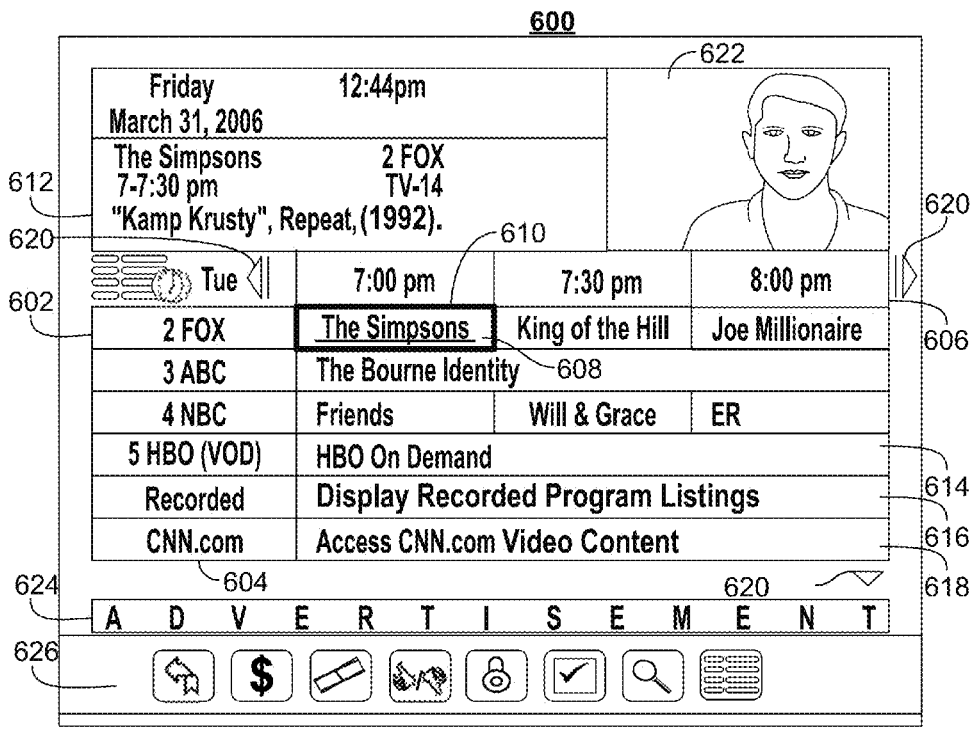
FIG. 6 shows an illustrative embodiment of a display screen that may be used to provide media guidance application listings and other media guidance information, in accordance with some embodiments of the disclosure.
Figure 7:
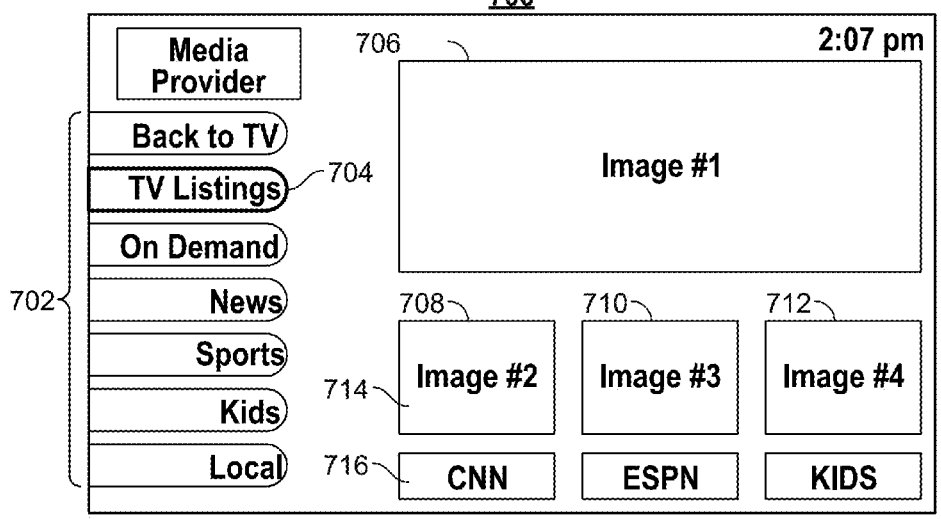
FIG. 7 shows another illustrative embodiment of a display screen that may be used to provide media guidance application listings, in accordance with some embodiments of the disclosure.

FIGS. 6-7 show illustrative display screens that may be used to provide media guidance data. The display screens shown in FIGS. 6-7 may be implemented on any suitable user equipment device or platform. While the displays of FIGS. 6-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 6 shows illustrative grid of a program listings display 600 arranged by time and channel that also enables access to different types of content in a single display. Display 600 may include grid 602 with: (1) a column of channel/content type identifiers 604, where each channel/content type identifier (which is a cell in the column) identifies a different channel or content type available; and (2) a row of time identifiers 606, where each time identifier (which is a cell in the row) identifies a time block of programming. Grid 602 also includes cells of program listings, such as program listing 608, where each listing provides the title of the program provided on the listing's associated channel and time. With a user input device, a user can select program listings by moving highlight region 610. Information relating to the program listing selected by highlight region 610 may be provided in program information region 612. Region 612 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 602 may provide media guidance data for non-linear programming including on-demand listing 614, recorded content listing 616, and Internet content listing 618. A display combining media guidance data for content from different types of content sources is sometimes referred to as a "mixed-media" display. Various permutations of the types of media guidance data that may be displayed that are different than display 600 may be based on user selection or guidance application definition (e.g., a display of only recorded and broadcast listings, only on-demand and broadcast listings, etc.). As illustrated, listings 614, 616, and 618 are shown as spanning the entire time block displayed in grid 602 to indicate that selection of these listings may provide access to a display dedicated to on-demand listings, recorded listings, or Internet listings, respectively. In some embodiments, listings for these content types may be included directly in grid 602. Additional media guidance data may be displayed in response to the user selecting one of the navigational icons 620. (Pressing an arrow key on a user input device may affect the display in a similar manner as selecting navigational icons 620.)

Display 600 may also include video region 622, and options region 626. Video region 622 may allow the user to view and/or preview programs that are currently available, will be available, or were available to the user. The content of video region 622 may correspond to, or be independent from, one of the listings displayed in grid 602. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 626 may allow the user to access different types of content, media guidance application displays, and/or media guidance application features. Options region 626 may be part of display 600 (and other display screens described herein), or may be invoked by a user by selecting an on-screen option or pressing a dedicated or assignable button on a user input device. The selectable options within options region 626 may concern features related to program listings in grid 602 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 9. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 7. Video mosaic display 700 includes selectable options 702 for content information organized based on content type, genre, and/or other organization criteria. In display 700, television listings option 704 is selected, thus providing listings 706, 708, 710, and 712 as broadcast program listings. In display 700 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 708 may include more than one portion, including media portion 714 and text portion 716. Media portion 714 and/or text portion 716 may be selectable to view content in full-screen or to view information related to the content displayed in media portion 714 (e.g., to view listings for the channel that the video is displayed on).

The listings in display 700 are of different sizes (i.e., listing 706 is larger than listings 708, 710, and 712), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 8:
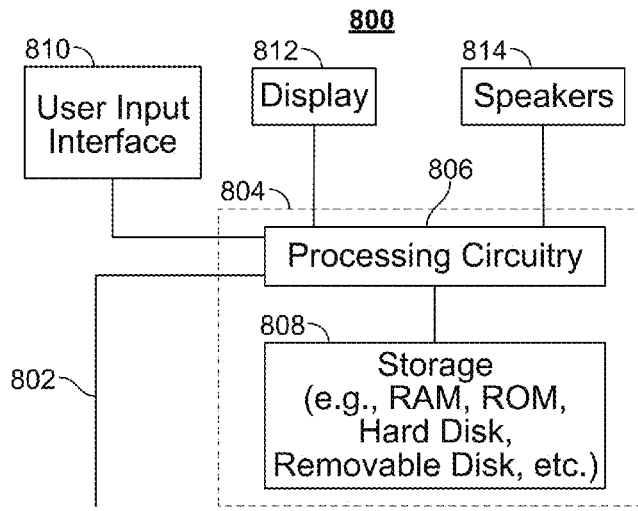
FIG. 8 is a block diagram of an illustrative user equipment (UE) device in accordance with some embodiments of the disclosure.

Users may access content and the media guidance application (and its display screens described above and below) from one or more of their user equipment devices. FIG. 8 shows a generalized embodiment of illustrative user equipment device 800. More specific implementations of user equipment devices are discussed below in connection with FIG. 9. User equipment device 800 may receive content and data via input/output (hereinafter "I/O") path 802. I/O path 802 may provide content (e.g., broadcast programming, on-demand programming, Internet content, content available over a local area network (LAN) or wide area network (WAN), and/or other content) and data to control circuitry 804, which includes processing circuitry 806 and storage 808. Control circuitry 804 may be used to send and receive commands, requests, and other suitable data using I/O path 802. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing.

Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for a media guidance application stored in memory (i.e., storage 808). Specifically, control circuitry 804 may be instructed by the media guidance application to perform the functions discussed above and below. For example, the media guidance application may provide instructions to control circuitry 804 to generate the media guidance displays. In some implementations, any action performed by control circuitry 804 may be based on instructions received from the media guidance application.

In client-server based embodiments, control circuitry 804 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as media guidance data described above. Nonvolatile memory may also be used (e.g., to launch a boot-up routine and other instructions). Cloud-based storage, described in relation to FIG. 9, may be used to supplement storage 808 or instead of storage 808.

Control circuitry 804 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of the user equipment 800. Circuitry 804 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment 800, the tuning and encoding circuitry (including multiple tuners) may be associated with storage 808.

A user may send instructions to control circuitry 804 using user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of user equipment device 800. For example, display 812 may be a touchscreen or touch-sensitive display. In such circumstances, user input interface 810 may be integrated with or combined with display 812. Display 812 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 812 may be HDTV-capable. In some embodiments, display 812 may be a 3D display, and the interactive media guidance application and any suitable content may be displayed in 3D. A video card or graphics card may generate the output to the display 812. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 804. The video card may be integrated with the control circuitry 804. Speakers 814 may be provided as integrated with other elements of user equipment device 800 or may be stand-alone units. The audio component of videos and other content displayed on display 812 may be played through speakers 814. In some embodiments, the audio may be distributed to a receiver (not shown), which processes and outputs the audio via speakers 814.

The guidance application may be implemented using any suitable architecture. For example, it may be a stand-alone application wholly-implemented on user equipment device 800. In such an approach, instructions of the application are stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to generate any of the displays discussed herein. Based on the processed instructions, control circuitry 804 may determine what action to perform when input is received from input interface 810. For example, movement of a cursor on a display up/down may be indicated by the processed instructions when input interface 810 indicates that an up/down button was selected.

In some embodiments, the media guidance application is a client-server based application. Data for use by a thick or thin client implemented on user equipment device 800 is retrieved on-demand by issuing requests to a server remote to the user equipment device 800. In one example of a client-server based guidance application, control circuitry 804 runs a web browser that interprets web pages provided by a remote server. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on equipment device 800. This way, the processing of the instructions is performed remotely by the server while the resulting displays are provided locally on equipment device 800. Equipment device 800 may receive inputs from the user via input interface 810 and transmit those inputs to the remote server for processing and generating the corresponding displays. For example, equipment device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to equipment device 800 for presentation to the user.

In some embodiments, the media guidance application is downloaded and interpreted or otherwise run by an interpreter or virtual machine (run by control circuitry 804). In some embodiments, the guidance application may be encoded in the ETV Binary Interchange Format (EBIF), received by control circuitry 804 as part of a suitable feed, and interpreted by a user agent running on control circuitry 804. For example, the guidance application may be an EBIF application. In some embodiments, the guidance application may be defined by a series of JAVA-based files that are received and run by a local virtual machine or other suitable middleware executed by control circuitry 804. In some of such embodiments (e.g., those employing MPEG-2 or other digital media encoding schemes), the guidance application may be, for example, encoded and transmitted in an MPEG-2 object carousel with the MPEG audio and video packets of a program.

Figure 9:
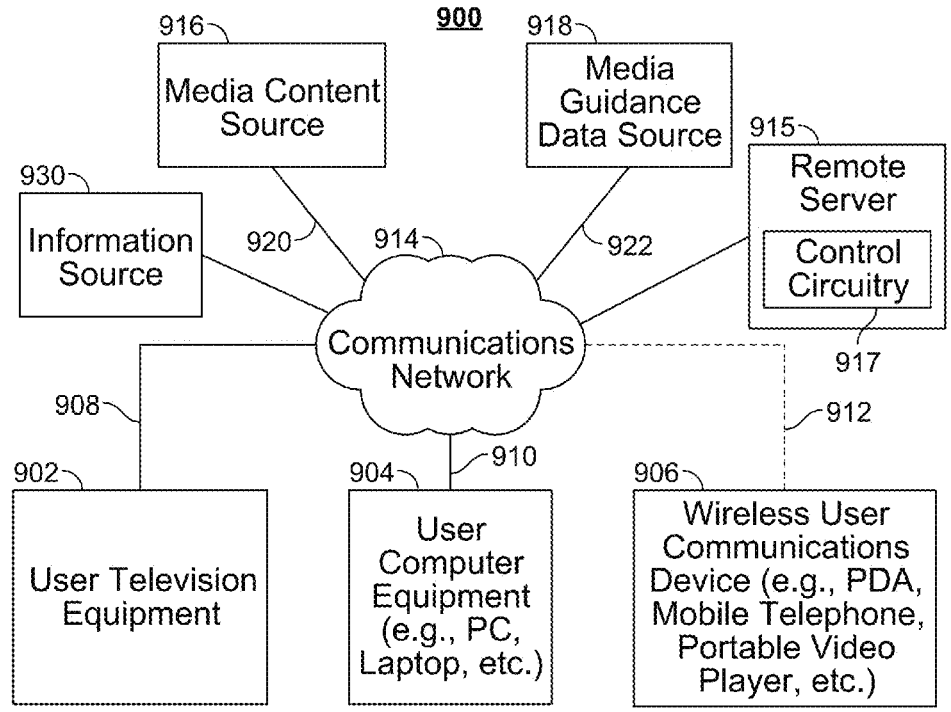
FIG. 9 is a block diagram of an illustrative media system in accordance with some embodiments of the disclosure.

User equipment device 800 of FIG. 8 can be implemented in system 900 of FIG. 9 as user television equipment 902, user computer equipment 904, wireless user communications device 906, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 8 may not be classified solely as user television equipment 902, user computer equipment 904, or a wireless user communications device 906. For example, user television equipment 902 may, like some user computer equipment 904, be Internet-enabled allowing for access to Internet content, while user computer equipment 904 may, like some television equipment 902, include a tuner allowing for access to television programming. The media guidance application may have the same layout on various different types of user equipment or may be tailored to the display capabilities of the user equipment. For example, on user computer equipment 904, the guidance application may be provided as a web site accessed by a web browser. In another example, the guidance application may be scaled down for wireless user communications devices 906.

In system 900, there is typically more than one of each type of user equipment device but only one of each is shown in FIG. 9 to avoid overcomplicating the drawing. In addition, each user may utilize more than one type of user equipment device and also more than one of each type of user equipment device.

In some embodiments, a user equipment device (e.g., user television equipment 902, user computer equipment 904, wireless user communications device 906) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 914. Namely, user television equipment 902, user computer equipment 904, and wireless user communications device 906 are coupled to communications network 914 via communications paths 908, 910, and 912, respectively. Communications network 914 may be one or more networks including the Internet, a mobile phone network, mobile voice or data network (e.g., a 4G or LTE network), cable network, public switched telephone network, or other types of communications network or combinations of communications networks. Paths 908, 910, and 912 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 912 is drawn with dotted lines to indicate that in the exemplary embodiment shown in FIG. 9 it is a wireless path and paths 908 and 910 are drawn as solid lines to indicate they are wired paths (although these paths may be wireless paths, if desired). Communications with the user equipment devices may be provided by one or more of these communications paths, but are shown as a single path in FIG. 9 to avoid overcomplicating the drawing.

Although communications paths are not drawn between user equipment devices, these devices may communicate directly with each other via communication paths, such as those described above in connection with paths 908, 910, and 912, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 914.

System 900 includes content source 916 and media guidance data source 918 coupled to communications network 914 via communication paths 920 and 922, respectively. Paths 920 and 922 may include any of the communication paths described above in connection with paths 908, 910, and 912. Communications with the content source 916 and media guidance data source 918 may be exchanged over one or more communications paths, but are shown as a single path in FIG. 9 to avoid overcomplicating the drawing. In addition, there may be more than one of each of content source 916 and media guidance data source 918, but only one of each is shown in FIG. 9 to avoid overcomplicating the drawing. (The different types of each of these sources are discussed below.) If desired, content source 916 and media guidance data source 918 may be integrated as one source device. Although communications between sources 916 and 918 with user equipment devices 902, 904, and 906 are shown as through communications network 914, in some embodiments, sources 916 and 918 may communicate directly with user equipment devices 902, 904, and 906 via communication paths (not shown) such as those described above in connection with paths 908, 910, and 912.

Content source 916 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 916 may be the originator of content (e.g., a television broadcaster, a Webcast provider, etc.) or may not be the originator of content (e.g., an on-demand content provider, an Internet provider of content of broadcast programs for downloading, etc.). Content source 916 may include cable sources, satellite providers, on-demand providers, Internet providers, over-the-top content providers, or other providers of content. Content source 916 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 918 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 918 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 918 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 918 may provide user equipment devices 902, 904, and 906 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 808, and executed by control circuitry 804 of a user equipment device 800. In some embodiments, media guidance applications may be client-server applications where only a client application resides on the user equipment device, and server application resides on a remote server. For example, media guidance applications may be implemented partially as a client application on control circuitry 804 of user equipment device 800 and partially on a remote server as a server application (e.g., media guidance data source 918) running on control circuitry of the remote server. When executed by control circuitry of the remote server (such as media guidance data source 918), the media guidance application may instruct the control circuitry to generate the guidance application displays and transmit the generated displays to the user equipment devices. The server application may instruct the control circuitry of the media guidance data source 918 to transmit data for storage on the user equipment. The client application may instruct control circuitry of the receiving user equipment to generate the guidance application displays.

Content and/or media guidance data delivered to user equipment devices 902, 904, and 906 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 900 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 9.

In one approach, user equipment devices may communicate with each other within a home network. User equipment devices can communicate with each other directly via short-range point-to-point communication schemes described above, via indirect paths through a hub or other similar device provided on a home network, or via communications network 914. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 916 to access content. Specifically, within a home, users of user television equipment 902 and user computer equipment 904 may access the media guidance application to navigate among and locate desirable content. Users may also access the media guidance application outside of the home using wireless user communications devices 906 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 914. These cloud resources may include one or more content sources 916 and one or more media guidance data sources 918. In addition or in the alternative, the remote computing sites may include other user equipment devices, such as user television equipment 902, user computer equipment 904, and wireless user communications device 906. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 904 or wireless user communications device 906 having content capture feature. Alternatively, the user can first transfer the content to a user equipment device, such as user computer equipment 904. The user equipment device storing the content uploads the content to the cloud using a data transmission service on communications network 914. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 8.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

It should be noted that process 1000 or any step thereof could be performed on, or provided by, any of the devices shown in FIGS. 8-9. For example, process 1000 may be executed by control circuitry 804 (FIG. 8) as instructed by a media guidance application implemented on a user device (e.g., user equipment devices 902, 904, and/or 906 (FIG. 9)) in order to control playback of a media asset on a user equipment based on indicia that a next event is delayed from an event start time. In addition, one or more steps of process 1000 may be incorporated into or combined with one or more steps of any other process or embodiment described herein.

Figure 10:
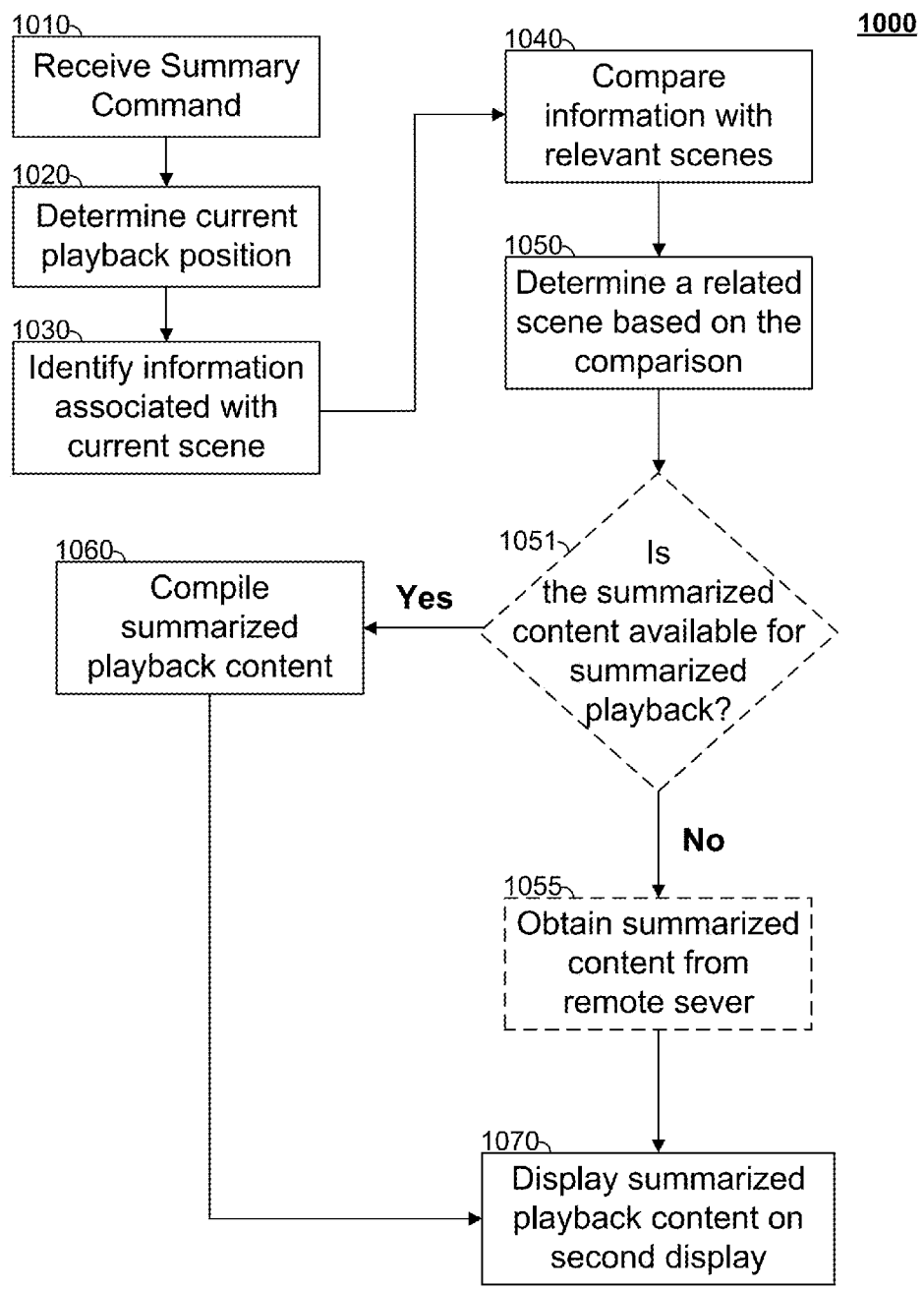
FIG. 10 depicts an illustrative flowchart of a process for providing summarized content related to a current scene.

FIG. 10 depicts an illustrative flowchart of providing summarized content related to a current scene, in accordance with some embodiments of the disclosure. Process 10 may be executed by control circuitry 1304 (e.g., in a manner instructed to control circuitry 1304 by the media guidance application). Control circuitry 1304 may be part of user equipment (e.g., user equipment, which may have any or all of the functionality of user television equipment 1402, user computer equipment 1404, and/or wireless communications device 1406), or of a remote server separated from the user equipment by way of communication network 1414, or distributed over a combination of both.

Process 1000 begins at 1010, where control circuitry 804, using a media guidance application, receives a summary command indicating that a user is requesting a summary of a scene or scenes related to a scene from a media asset the media guidance application is currently playing in a first display. For example, the control circuitry 804 may detect a command indicating the user wishes to play a summary of scene related to Mr. Rogers' and Chef Brockett. In some embodiments, the control circuitry 804 may monitor audio using an audio input subsystem, e.g., a microphone, and determine when a key phrase of phrases are invoked to issue a commend such as voice command 220 as depicted in FIG. 2. In still other embodiments, the control circuitry 804 may provide an interface element 210 that informs the control circuitry 804 that it should begin monitoring audio for an audio command. In one example, the interface element 210 may be a command button on a remote control or on the surface of a mobile device that provides commands to the control circuitry 804, while in another example the interface element 210 may be an audio phrase recognized by the control circuitry 804 to begin receiving commands.

In response to the summary command, the process 1000 continues to 1020, where the control circuitry 804 determines a current playback position of the current scene in a media asset being viewed in the first display.

Process 1000 continues at 1030, where the control circuitry 804 identifies information associated with the current scene, "identifying information." For example, the control circuitry 804 may use the topics discussed by characters to search a catalogue of scenes from the current episode or other episodes from the current show as information to identify a related scene or scenes.

At 104, the control circuitry 804 compares the identifying information with information associated with a plurality of relevant scenes. For example, the control circuitry 804 may use the topics discussed by characters to search a catalogue of scenes from the current episode or other episodes from the current show. Still further, the control circuitry 804 may use the identifying information in combination with a mapping between the current scene and candidate scenes to identify one or more related scenes as previously described herein.

Process 1000 continues at 1050, where the control circuitry 804 determines a related scene or scenes based on the comparison between the identifying information and the information associated with the plurality of relevant scenes. For example, the control circuitry 804 may determine a relationship between a current scene and one or more related scenes that will be used to generate the summarized playback content. In some embodiments, it is advantageous to previously map a first collection of scenes to a second collection of collection of scenes. For example, a control circuitry 804 may map a collection of scenes from a show, series, or movie to a collection of scenes from a related, or unrelated novel. For example, it may be advantageous to map scenes from the popular series Game of Thrones from HBO to the series of novels written by George R. R. Martin called A Song of Ice and Fire. In another example, it may be advantageous to cross-map the scenes from the Game of Thrones to one another, essentially mapping related scenes across the series.

In some embodiments, the control circuitry 804 creates a map of related scenes using comparisons between pertinent features from the scenes being mapped. The control circuitry 804 may, for example, divide a candidate novel, or series, into small units like chapters, portions of chapters to define a set of candidate scenes for comparisons. Alternatively, another system may previously divide the candidate scenes. Furthermore, the control circuitry 804 will divide an episode, movie, or series of episodes into a plurality of different scenes. While this embodiment is described with reference to comparing candidate scenes from a novel with a current scene, one skilled in the art would recognize that the same principals apply to comparing candidate scenes from other episodes of a show, or even episodes of other shows, movies, or other media content types such as audio, podcast, webpages, newspaper, anthologies, in the same manner as applied to the novel.

The control circuitry 804 may determine pertinent features by matching phrases, dialogue, entities, objects, locations from each scene being mapped to its related scenes as pertinent features for comparison. The control circuitry 804 may analyze text associated with the scenes being mapped which the control circuitry 804 may obtains from a remote data source such as the Film & Television Literature Index with Full Text available from EBSCO. In some embodiments, the control circuitry 804 may use image and speech recognition algorithms to extract the pertinent features from the audio and video related to the scenes being mapped. The control circuitry 804 gives each of the pertinent features a weight, Wx, according the importance of that feature. For example, the control circuitry 804 may give all pertinent features related to famous dialogue a first weight, $W_1$. The control circuitry 804 may extract famous dialogues by using syntactical and semantic parsing and using a data source of pertinent text, for example a community driven effort to parse movie scenes or a commercial data store. The control circuitry 804 may give the names of entities and object of a scene, e.g., cast role names, places, things, a second weight, $W_2$, using part-of-speech ("POS") tagging or other natural language processing approaches. Further the control circuitry 804 may give phrases from predefined indexes a third weight, $W_3$. Further, the control circuitry 804 may determine that phrases of some variable length should be given a fourth weight, $W_4$. For example, the control circuitry 804 may split the text of a dialogue associated with the current scene based on stop words, e.g., a commonly used word (such as "the") that a search engine has been programmed to ignore. The remaining phrases, e.g., sets of words occurring between the stop words, also called n-grams, may be compared to lengths and given an appropriate weight. For example, the control circuitry 804 may give all 4-word n-grams a weight commensurate with the complexity of the 4-word n-grams while giving all 2-word n-grams a different weight, typically a lesser weight to account for lesser specificity.

The control circuitry 804 may then compare the pertinent features present in each scene from the first set of scenes and the second set of scenes to build relationship scores between sets of scenes. For example, the control circuitry 804 may generate a list of weighted features for each scene to be mapped and compare those features against the weighted features of the other scenes. If, by way of example, the first set of scenes are scenes from the HBO series Game of Thrones and the second set of scenes are scene from novels in A Song of Ice and Fire, the control circuitry 804 may extract pertinent features for each relevant scene of the show and the novel. The control circuitry 804 may generate a first n×t matrix $M_1(n, t)$ associated with the weighted features in those scenes from Game of Thrones. In this example, the rows (n) of matrix $M_1$ represent the number of scenes from Game of Thrones being mapped against scenes from A Song of Ice and Fire. The columns (t) of the matrix $M_1$ represent the combined number of all pertinent features found in scenes of Game of Thrones and scenes of A Song of Ice and Fire. The control circuitry 804 may generate a second t×m matrix $M_2(t, m)$. In the second matrix $M_2$, the rows (t) represent the combined number of all pertinent features found in scenes of Game of Thrones and scenes of A Song of Ice and Fire while the rows (m) represent the number of scenes in A Song of Ice and Fire. Thus, the control circuitry 804 generates two matrices, $M_1(n,t)$ and $M_2(t,m)$ where n=the number of scenes in a first set of scenes, t=the combined number of pertinent features across all scenes, and m=the number of scenes in the second set of scene. Thus, each entry in the first matrix $M_1(x,y)$ corresponds to a feature weight associated with the xth scene of Game of Thrones to the yth feature. And each entry in the second matrix $M_2(a,b)$ corresponds with the a feature weight associated with the bth scene of A Song of Ice and Fire to the bth feature. The control circuitry 804 generates a third matrix $M_3$ from the first matrix $M_1$ and second matrix $M_2$. For example, the control circuitry 804 performs a matrix cross-product between the first matrix $M_1$ and second matrix $M_2$. Thus, the control circuitry 804 may determine the probability that the xth scene of first set of scenes, in this example Game of Thrones, is related to the yth scene from the second set of scenes, in this example A Song of Ice and Fire, by analyzing the cross-product matrix $M_3$ of the first matrix $M_1$ and second matrix $M_2$. For example, the control circuitry 804 could determine the probability that the xth scene from the first set of scenes is related to the yth scene from the second set of scenes by computing $max(M3[x,i])/\Sigma(M3[x,i])$ where i=0 to t. In some embodiments, the control circuitry 804 may limit the pertinent features for comparison based on criteria received from a user. For example, a user may ask for scenes related the current scene based on dialogue characters are having in the current scene. Using the reference to the HBO series Game of Thrones, a user may be watching a scene where a character references an event from an earlier episode, e.g., references the "Red Wedding." The user, perhaps having not seen that scene, not recalling the scene, or desiring to reexperience the scene, may direct the control circuitry 804 to replay the "Red Wedding." The control circuitry 804 may limit the pertinent features to features relevant to finding the "Red Wedding" scene.

Using a mapping of relationships between two sets of scenes, for example using a matrix $M_3$ as described above, the control circuitry 804 may determine which among a set of scenes is most closely related to a particular scene or particular set of features from a current scene. In some embodiments, the control circuitry 804 may receive user input that indicates the user would like to know more about a particular scene. For example, the control circuitry 804 may receive voice input, e.g., "tell me in detail what happened in novel," "is this scene in novel," or "did this scene happen like this in the novel." The control circuitry 804 may make a determination of the type of information the user is requesting and compare a mapping of chapters, paragraphs, or some other portion of a novel to a current scene being viewed.

In some embodiments, process 1000 continues at 1051, where the control circuitry 804 determines whether content from the related scene or scenes is available for summarized playback. If the control circuitry 804 determines that the content is not available, the process 1000 may continue at 1055. If the control circuitry 804 determines that the content is available, the process 1000 may continue at 1060.

At 1055, control circuitry 804 may obtain content from the related scene or scenes for summarized playback from a remote server. For example, in some embodiments the control circuitry 804 may receive video from a video-on-demand ("VOD") service. The control circuitry 804 may contact a server related to a VOD service to obtain an entire scene deemed related by the control circuitry 804. The control circuitry 804 may request that a remote server related to a VOD service provide the control circuitry 804 with frames and audio from the related scene or scenes. Still further, the control circuitry 804 may request the summarized playback content from the server rather than compiling the summarized playback content as described with reference to 1060.

At 1060, control circuitry 804 compile summarized playback content associated with the current scene and the related scene or scenes.

Process 1000 continues at 1070, where the control circuitry 804 displays summarized playback content in a second display. In some embodiments, the control circuitry 804 displays the summarized playback content in the second display simultaneous with continued display of the current scene in the first display. In other embodiments, the control circuitry 804 suspends playback of the current scene in the first display while playing the summarized playback content in the second display.

It should be noted that process 1060 or any step thereof could be performed on, or provided by, any of the devices shown in FIGS. 8-9. For example, process 1060 may be executed by control circuitry 804 (FIG. 8) as instructed by a media guidance application implemented on a user device (e.g., user equipment devices 902, 904, and/or 906 (FIG. 9)) in order to control playback of a media asset on a user equipment based on indicia that a next event is delayed from an event start time. In addition, one or more steps of process 1060 may be incorporated into or combined with one or more steps of any other process or embodiment described herein.

Figure 11:
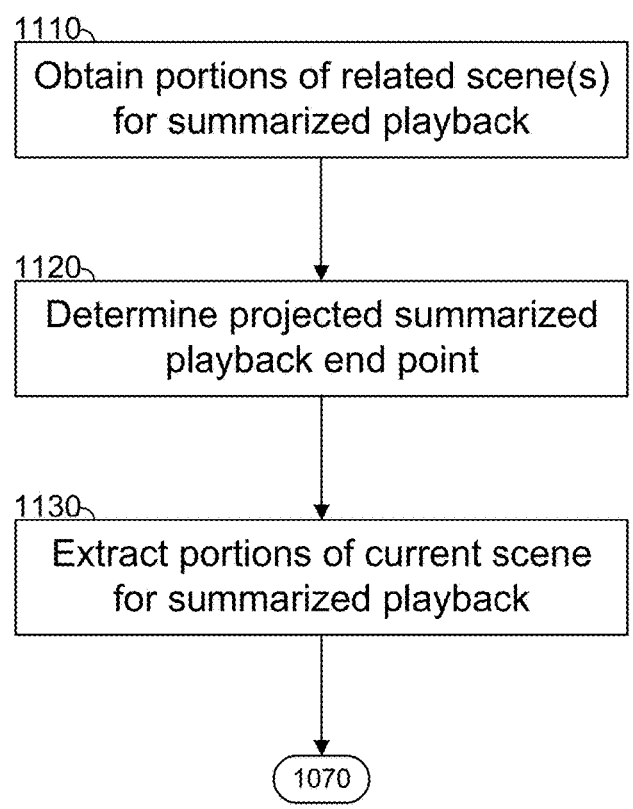
FIG. 11 depicts an illustrative flowchart of a process for compiling summarized content related to a current scene.

FIG. 11 depicts an illustrative flowchart of compiling summarized content related to a current scene, in accordance with some embodiments of the disclosure. The process 1060 continues at 1110, where the control circuitry 804 obtains one or more portions of the related scene or scenes for inclusion in the summarized playback content.

The control circuitry 804 continues at 1120 by determining a projected summarized playback end point in the current scene. The projected summarized playback end point is based on the length of the one or more portions of the related scene or scenes which were extracted for inclusion in the summarized playback content.

Process 1060 continues at 1130, where the control circuitry 804 extract one or more portions of the current scene for inclusion in the summarized playback content. The control circuitry 804 includes content of the current scene that occurs after the current playback position and before the projected summarized playback end point content. By including this content, the control circuitry 804 includes information to in the summary playback that will summarize portions of the current scene that would play during display of the summarized playback.

It should be noted that process 1050A or any step thereof could be performed on, or provided by, any of the devices shown in FIGS. 8-9. For example, process 1050A may be executed by control circuitry 804 (FIG. 8) as instructed by a media guidance application implemented on a user device (e.g., user equipment devices 902, 904, and/or 906 (FIG. 9)) in order to control playback of a media asset on a user equipment based on indicia that a next event is delayed from an event start time. In addition, one or more steps of process 1050A may be incorporated into or combined with one or more steps of any other process or embodiment described herein.

Figure 12:
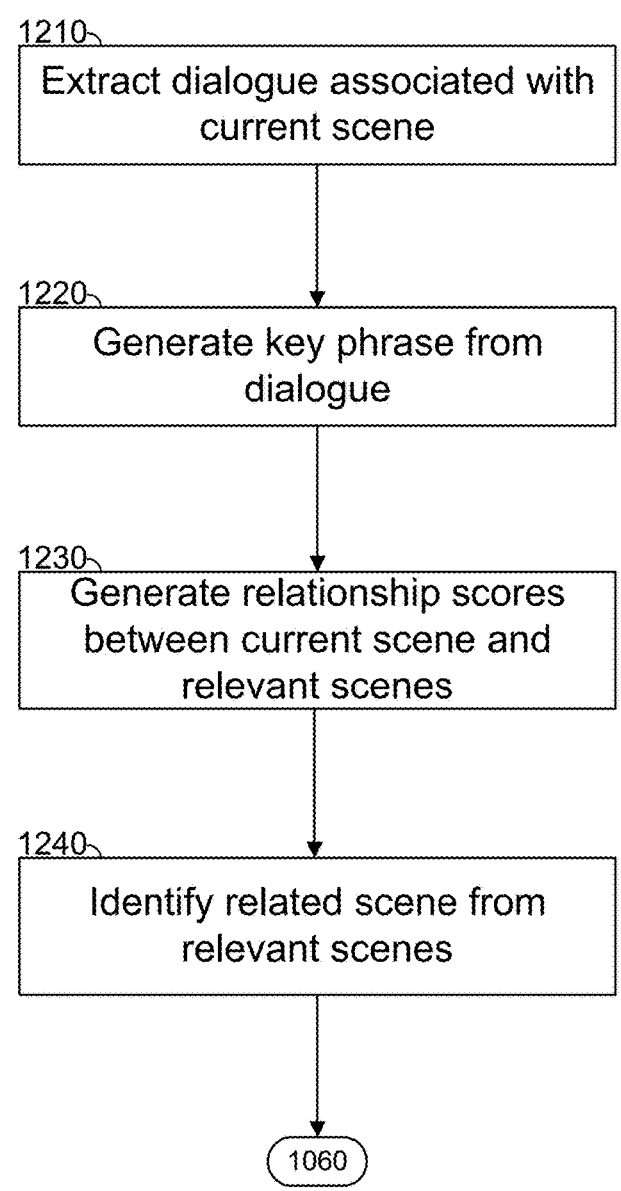
FIG. 12 depicts an illustrative flowchart of a process for determining a scene related to a current scene.

FIG. 12 depicts an illustrative flowchart of a process for determining a scene related to a current scene, in accordance with some embodiments of the disclosure. The control circuitry 804 may determine scenes or scenes related to a current scene using dialogue from the current scene. Process 1050A may begin at 1210, where the control circuitry 804 extracts dialogue associated with the current scene. For example, the media guidance application 100 may extract dialogue associated with the current scene and generates a plurality of key phrases from the dialogue associated with the current scene. For example, the control circuitry 804 may use natural language processing to extract objects, names, and places the characters are speaking about in the current scene. In some embodiments, the control circuitry 804 uses audio text recognition to extract dialogue associated with the current scene. In some embodiments, the control circuitry 804 accesses a data source containing dialogue associated with the current scene. The data source may be either located locally with the control circuitry 804 or on a remote server.

Process 1050A continues at 1220, where the control circuitry 804 generates a plurality of key phrases from the dialogue associated with the current scene. For example, the control circuitry 804 may split the text of a dialogue associated with the current scene based on stop words, e.g., a commonly used word (such as "the") that a search engine has been programmed to ignore. In some embodiments, control circuitry 804 may extract key phrases from famous dialogues by using syntactical and semantic parsing and using a data source of pertinent text, for example a community driven effort to parse movie scenes or a commercial data store. In some embodiments, the control circuitry 804 generates key phrases using part-of-speech ("POS") tagging or other natural language processing approaches and obtains names of relevant entities and objects from the current scene, e.g., cast names, role names, places, or artifact names.

For example, the control circuitry 804 may generate a plurality of relationship scores between the current scene and the plurality of relevant scenes based on the key phrases and the information associated with the plurality of relevant scenes. Using the example from above, the control circuitry 804 may identify several relevant scenes containing Chef Brockett and Mr. Rogers. Using the dialogue of the current scene, control circuitry 804 may determine that "cake" and "contest" are key phrases and generate a plurality of relationship scores for use using containing Chef Brockett and Mr. Rogers. The relationship score reflecting the presence of related topics and dialogue as to the key phrases. control circuitry 804 may then identify the related scene from the plurality of relevant scenes based on the plurality of relationship scores.

At 1230, the control circuitry 804 continues by generating a plurality of relationship scores as between the current scene and relevant scenes, e.g., other scenes from a series of episodes or movies. For example, the control circuitry 804 may use the plurality of key phrases generated at 1220 and information associated with the plurality of relevant scenes to generate relationship scores.

Process 1050A continues at 1240, where the control circuitry 804 identifies the related scene or scenes from the relevant scenes based on the relationship scores. The scenes identified at 1240 may then be compiled into the summarized content as described with reference to step 1060 of process 1000.

It should be noted that process 1070 or any step thereof could be performed on, or provided by, any of the devices shown in FIGS. 8-9. For example, process 1070 may be executed by control circuitry 804 (FIG. 8) as instructed by a media guidance application implemented on a user device (e.g., user equipment devices 902, 904, and/or 906 (FIG. 9)) in order to control playback of a media asset on a user equipment based on indicia that a next event is delayed from an event start time. In addition, one or more steps of process 1070 may be incorporated into or combined with one or more steps of any other process or embodiment described herein.

Figure 13:
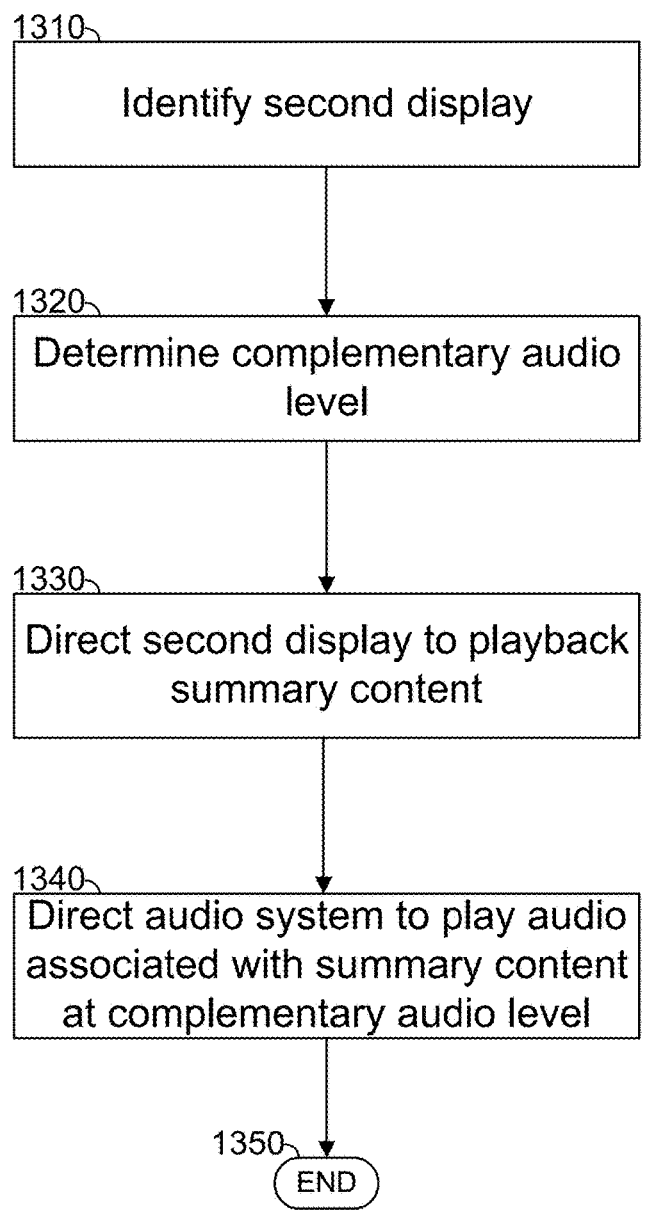
FIG. 13 depicts an illustrative flowchart of a process for displaying summarized content.

FIG. 13 depicts an illustrative flowchart of a process for displaying summarized content, in accordance with some embodiments of the disclosure. Process 1070 begins at 1310, where the control circuitry 804 identifies a second display from several available displays. The control circuitry 804 identifies the second display as one available for displaying summary content.

At 1320, the control circuitry 804 continues by determining a complementary audio level to apply to the second display. The control circuitry 804 determines the complementary audio level to minimize audio disruptions to the continued playback and display of the current scene on the first display. Thus, in embodiments where the control circuitry 804 plays the summary content at the same time as the continued playback of the current scene, the audio of the summary content, is such audio is played, would have only a slight impact on the viewing of the current scene.

Process 1070 continues at 1330, where the control circuitry 804 directs the second display to playback the summary content. As described above, in some embodiments, the playback of the summary content occurs at the same time as continued display of the current scene in the first display.

At 1340, the control circuitry 804 direct an audio system to playback audio associated with the summary content and directs the audio subsystem to play back that audio at a volume corresponding to the complementary audio level.

It should be noted that process 1010 or any step thereof could be performed on, or provided by, any of the devices shown in FIGS. 8-9. For example, process 1010 may be executed by control circuitry 804 (FIG. 8) as instructed by a media guidance application implemented on a user device (e.g., user equipment devices 902, 904, and/or 906 (FIG. 9)) in order to control playback of a media asset on a user equipment based on indicia that a next event is delayed from an event start time. In addition, one or more steps of process 1010 may be incorporated into or combined with one or more steps of any other process or embodiment described herein.

Figure 14:
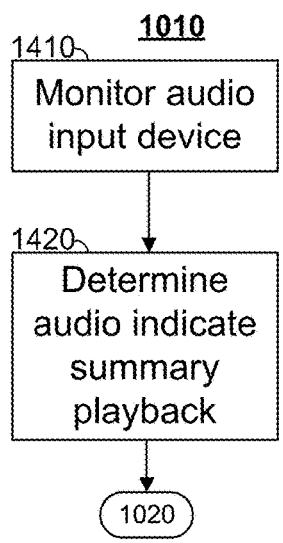
FIG. 14 depicts an illustrative flowchart of a process for receiving a summary command.

FIG. 14 depicts an illustrative flowchart of a process for receiving a summary command, in accordance with some embodiments of the disclosure. Process 1010 begins at 1410, where the control circuitry 804 monitors an audio input device. For example, the control circuitry 804 may monitoring a microphone coupled with the control circuitry 804. In some embodiments, the control circuitry 804 may monitoring audio input captured on a remote device that is communicating an audio stream, or a signature of an audio stream, to the control circuitry 804.

Process 1010 continues at 1420 where the control circuitry 804, in response to receiving audio input, determines that the audio input indicates a summary command.

It should be noted that process 1050B or any step thereof could be performed on, or provided by, any of the devices shown in FIGS. 8-9. For example, process 1050B may be executed by control circuitry 804 (FIG. 8) as instructed by a media guidance application implemented on a user device (e.g., user equipment devices 902, 904, and/or 906 (FIG. 9)) in order to control playback of a media asset on a user equipment based on indicia that a next event is delayed from an event start time. In addition, one or more steps of process 1050B may be incorporated into or combined with one or more steps of any other process or embodiment described herein.

Figure 15:
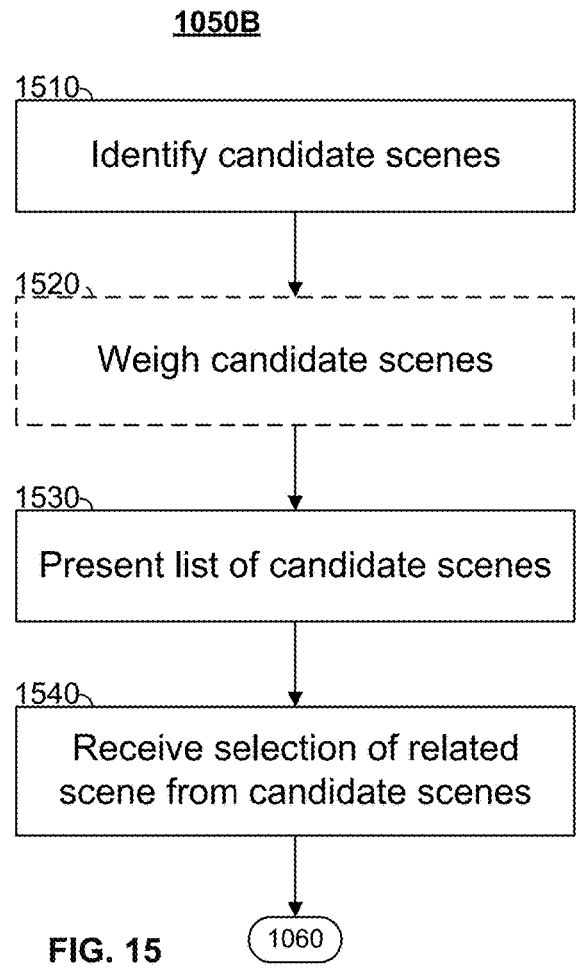
FIG. 15 depicts an illustrative flowchart of a process for determining a scene related to a current scene.

FIG. 15 depicts an illustrative flowchart of process for determining a scene related to a current scene, in accordance with some embodiments of the disclosure. Process 1050B begins at 1510, where control circuitry 804 identifies one or more candidate scenes. The control circuitry 804 identifies these scenes as related, or potentially related, to the current scene in the manners described above. But it may be advantageous to obtain user confirmation of which scene or scenes from the candidate scenes, the user wishes the control circuitry 804 to summarize during the summary playback.

In some embodiments, the control circuitry 804 continues process 1050B at 1520, where the control circuitry 804 weights the candidate scenes based on a comparison between the identifying information from the current scene and information associated with each of relevant scenes.

At 1530, the control circuitry 804 presents a list of the candidate scenes to the user. For example, the control circuitry 804 may present a simple list in the media guidance application for the user to select from. In other embodiments, the control circuitry 804 may present the list of candidate scenes in a second display, such as in a PIP window or on a mobile device.

The control circuitry 804 continues process 1050B at 1540, where the control circuitry 804 receives, at the user equipment, a selection of one or more of the candidate scenes that the control circuitry 804 should use as the related scene or scenes.

It should be noted that process 1050C or any step thereof could be performed on, or provided by, any of the devices shown in FIGS. 8-9. For example, process 1050C may be executed by control circuitry 804 (FIG. 8) as instructed by a media guidance application implemented on a user device (e.g., user equipment devices 902, 904, and/or 906 (FIG. 9)) in order to control playback of a media asset on a user equipment based on indicia that a next event is delayed from an event start time. In addition, one or more steps of process 1050C may be incorporated into or combined with one or more steps of any other process or embodiment described herein.

Figure 16:
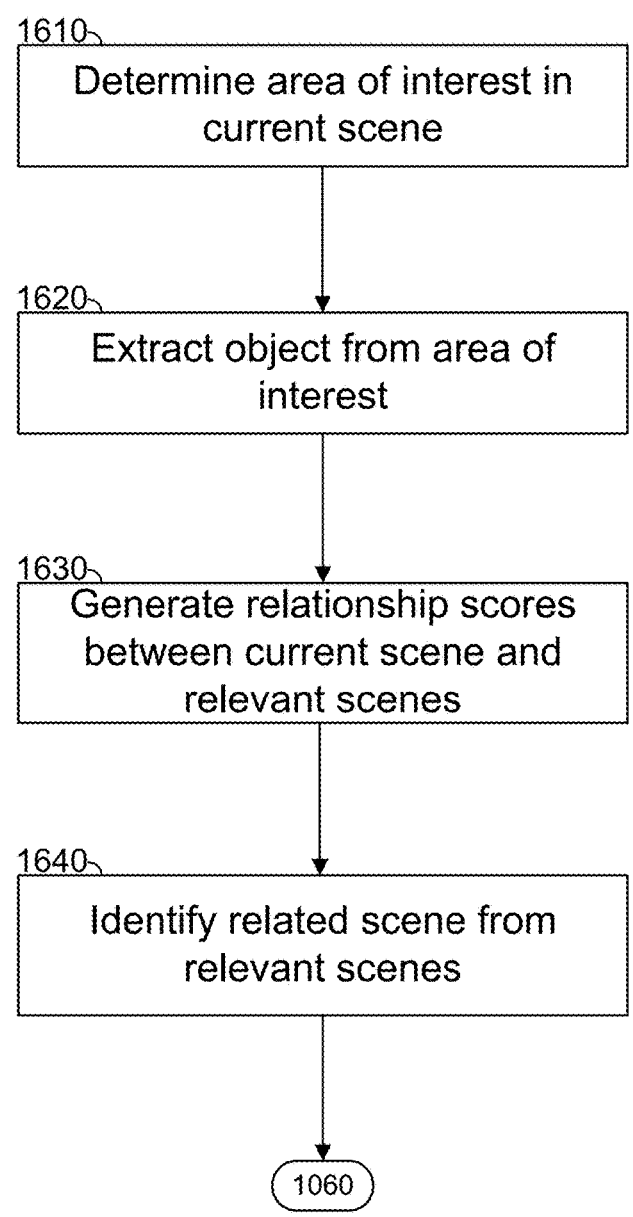
FIG. 16 depicts an illustrative flowchart of a process for determining a scene related to a current scene.

FIG. 16 depicts an illustrative flowchart of process for determining a scene related to a current scene, in accordance with some embodiments of the disclosure. Process 1050C begins at 1610, where the control circuitry 804 determines a portion of the current scene as an area of interest.

Process 1050C continues at 1620, where the control circuitry 804 extracts an object from the portion of the current scene. For example, the control circuitry 804 may use computer vision methods to locate a cake as an object in a scene of Mr. Rogers' Neighborhood.

Process 1050C continues at 1630, where the control circuitry 804 generates a plurality of relationship scores as between the current scene and relevant other scenes from a series of episodes or movies. The control circuitry 804 uses information associated with the object extracted in 1620 and with information associated with the relevant scenes to generate the relationship scores.

At 1640, the control circuitry 804 identifies the related scene or scenes from the relevant scenes based on the plurality of relationship scores. For example, the control circuitry 804 may consider any relationship above a predetermined threshold represents a valid relationship such that the scene should be included in summary content.

It should be noted that process 1700 or any step thereof could be performed on, or provided by, any of the devices shown in FIGS. 8-9. For example, process 1700 may be executed by control circuitry 804 (FIG. 8) as instructed by a media guidance application implemented on a user device (e.g., user equipment devices 902, 904, and/or 906 (FIG. 9)) in order to control playback of a media asset on a user equipment based on indicia that a next event is delayed from an event start time. In addition, one or more steps of process 1700 may be incorporated into or combined with one or more steps of any other process or embodiment described herein.

Figure 17:
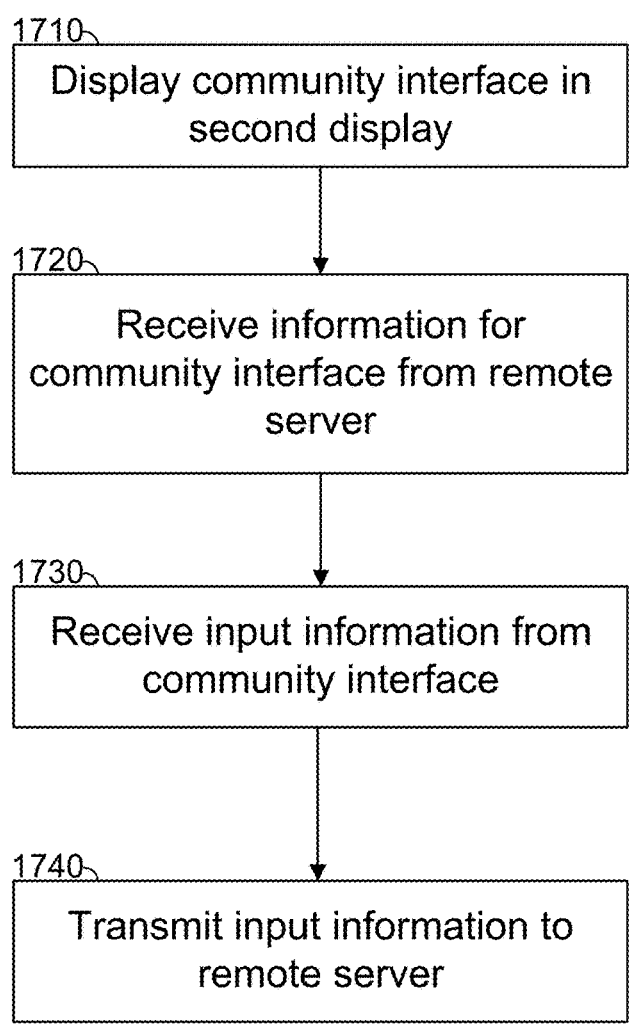
FIG. 17 depicts an illustrative flowchart of a process for controlling a community interface.

FIG. 17 depicts an illustrative flowchart of a process for controlling a community interface, in accordance with some embodiments of the disclosure. Process 17 begins at 1710, where the control circuitry 804 displays a community interface in the second display. For example, the control circuitry 804 may embed interfaces to services such as Facebook, Twitter, Instagram, Reddit, IMDB, in which the control circuitry 804 may receive input from the user and from an online data source for display in the community interface.

Process 1700 continues at 1720, where the control circuitry 804 receives information from a remote server for display in the second display. For example, the community interface shown in the second display may include a chat windows for sending and receiving text messages as depicted in FIG. 5.

At 1730, the control circuitry 804 receives input information from the community interface. For example, the control circuitry 804 may receive keystrokes from a physical or virtual keyboard entered into an input field of the community interface. In some embodiments, the control circuitry 804 may recognize voice commands as providing input to the community interface.

Process 1700 continues at QCI40, where the control circuitry 804 transmits the input information received in the community interface to the remote server.

It should be noted that process 1110 or any step thereof could be performed on, or provided by, any of the devices shown in FIGS. 8-9. For example, process 1110 may be executed by control circuitry 804 (FIG. 8) as instructed by a media guidance application implemented on a user device (e.g., user equipment devices 902, 904, and/or 906 (FIG. 9)) in order to control playback of a media asset on a user equipment based on indicia that a next event is delayed from an event start time. In addition, one or more steps of process 1110 may be incorporated into or combined with one or more steps of any other process or embodiment described herein.

Figure 18:
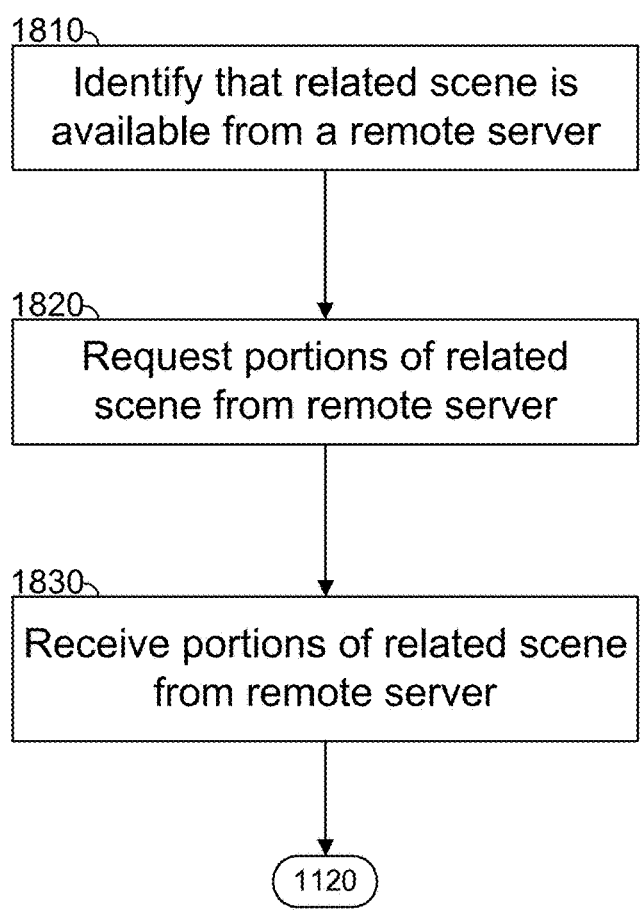
FIG. 18 depicts an illustrative flowchart of a process for obtaining portions of related scenes for summarized playback.

FIG. 18 depicts an illustrative flowchart of a process for obtaining portions of related scenes for summarized playback, in accordance with some embodiments of the disclosure. Process 1110 begins at 1810, where the control circuitry 804 identifies that the related scene or scenes are available from a remote server. For example, the control circuitry 804 may identify metadata associated with the related scene or scenes including an identifier associated with the current scene. The control circuitry 804 may issue a query to a remote server, using the associated metadata, inquiring whether the remote server can provide the related scene or scenes.

At 1820, the control circuitry 804 requests, from a remote server, portions of the related scene or scenes. For example, the control circuitry 804 determines that the related scene or scenes are available from the remote server. The control circuitry 804 may request portions of the related scene or scenes from the remote server. In this way, the control circuitry 804 does not need to store audio and video of every candidate scene to process a user's summary command.

Process 1110 continues at 1820, where the control circuitry 804 receives, from the remote server, portions of the related scene or scenes. Using the portions of the related scene or scenes, the control circuitry 804 can content with playback of the summarized content according to the disclosure herein.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for playback of summary content related to playback of a current scene in a media asset being displayed in a first display, the method comprising:
receiving a summary command, at a user equipment, indicating that a user viewing the current scene is requesting a summary of a related scene; and
in response to the summary command, playing summarized playback content in a second display, by:
determining a current playback position of the current scene in the media asset being viewed in the first display;
identifying information associated with the current scene;
comparing the identifying information with information associated with a plurality of relevant scenes;
determining a related scene based on the comparison between the identifying information and the information associated with the plurality of relevant scenes;
compiling the summarized playback content, wherein the summarized playback content is associated with the current scene and the related scene, by:
obtaining one or more portions of the related scene for inclusion in the summarized playback content;
determining a projected summarized playback end point in the current scene, wherein the projected summarized playback end point is based on the length of the one or more portions of the related scene extracted for inclusion in the summarized playback content and the current playback position; and
extracting one or more portions of the current scene for inclusion in the summarized playback content, the one or more portions of the current scene occurring after the current playback position and before the projected summarized playback end point such that the summarized playback content includes information to summarize portions of the current scene that would play during display of the summarized playback; and
displaying in the second display, simultaneous with continued display of the current scene in the first display, the summarized playback content.

2. The method of claim 1, wherein determining the related scene based on identifying information associated with the current scene and comparing the identifying information with information associated with the plurality of relevant scenes comprises:
extracting dialogue associated with the current scene;
generating a plurality of key phrases from the dialogue associated with the current scene;
generating a plurality of relationship scores as between the current scene and the plurality of relevant scenes based on the plurality of key phrases and the information associated with the plurality of relevant scenes; and
identifying the related scene from the plurality of relevant scenes based on the plurality of relationship scores.

3. The method of claim 1, wherein displaying in the second display comprises:
identifying the second display from a plurality of displays, wherein the second display is available to display the summary content;
determining a complementary audio level to apply to the second display, wherein the complementary audio level is determined to minimize audio disruptions to the continued display of the current scene on the first display;
directing the second display to playback the summary content at the same time as continued display of the current scene in the first display; and
directing an audio system to playback audio associated with the summary content at the complementary audio level.

4. The method of claim 1, further comprises:
receiving the summary command, at a user equipment, by:

monitoring an audio input device; and
in response to receiving audio input, determining that the audio input indicates the summary command; and
determining the related scene by:
identifying a plurality of candidate scenes;
presenting a list of the plurality of candidate scenes to the user; and
receiving, at the user equipment, a selection of one of the plurality of candidate scenes as the related scene.

5. The method of claim 4, further comprising:
weighting the plurality of candidate scenes based on the comparison between the identifying information and the information associated with the plurality of relevant scenes.

6. The method of claim 1, wherein determining the related scene based on identifying information associated with the current scene and comparing the identifying information with information associated with the plurality of candidate scenes comprises:
determining a portion of the current scene as an area of interest;
extracting an object from the portion of the current scene;
generating a plurality of relationship scores as between the current scene and the plurality of relevant scenes based on information associated with the object and the information associated with the plurality of relevant scenes; and
identifying the related scene from the plurality of relevant scenes based on the plurality of relationship scores.

7. The method of claim 1, further comprising:
determining a second related scene from the plurality of relevant scenes;
extracting one or more portions of the second related scene for inclusion in the summarized playback content; and
combining the one or more portions of the first related scene, the one or more portions of the second related scene, and the one or more portions of the current scene for inclusion in the summarized playback content.

8. The method of claim 1, further comprising:
displaying a community interface in the second display;
receiving information from a remote server for display in the second display;
receiving input information from the community interface; and
transmitting the input information to the remote server.

9. The method of claim 1, further comprising:
receiving, at a second playback position, a second summary command;
identifying a second related scene related to the current scene at the second playback position;
determining, in response to the second summary command, that the second related scene is not available for summarized playback;
in response to determining that the second related scene is not available for summarized playback, requesting a remote summary of the second related scene from a remote server; and
displaying the remote summary on the second display simultaneous with the continued display of the current scene in the first display.

10. The method of claim 1, wherein obtaining one or more portions of the related scene for inclusion in the summarized playback content comprises:
identifying that the related scene is available from a remote server;
requesting, from a remote server, the one or more portions of the related scene; and
receiving, from the remote server, the one or more portions of the related scene.

11. A system for playback of summary content related to playback of a current scene in a media asset being displayed in a first display, the system comprising:
control circuitry configured to:
receive a summary command indicating that a user viewing the current scene is requesting a summary of a related scene; and
in response to the summary command, play summarized playback content in a second display, wherein the control circuitry is further configured, when playing back summarized playback content, to:
determine a current playback position of the current scene in the media asset being viewed in the first display;
identify information associated with the current scene;
compare the identifying information with information associated with a plurality of relevant scenes;
determine a related scene based on the comparison between the identifying information and the information associated with the plurality of relevant scenes;
compile the summarized playback content, wherein the summarized playback content is associated with the current scene and the related scene and the control circuitry is further configured, when compiling the summarized playback content, to:
obtain one or more portions of the related scene for inclusion in the summarized playback content;
determine a projected summarized playback end point in the current scene, wherein the projected summarized playback end point is based on the length of the one or more portions of the related scene extracted for inclusion in the summarized playback content and the current playback position; and
extract one or more portions of the current scene for inclusion in the summarized playback content, the one or more portions of the current scene occurring after the current playback position and before the projected summarized playback end point such that the summarized playback content includes information to summarize portions of the current scene that would play during display of the summarized playback; and
display in the second display, simultaneous with continued display of the current scene in the first display, the summarized playback content.

12. The system of claim 11, wherein control circuitry is further configured, when determining the related scene based on identifying information associated with the current scene and comparing the identifying information with information associated with the plurality of relevant scenes, to:
extract dialogue associated with the current scene;
generate a plurality of key phrases from the dialogue associated with the current scene;
generate a plurality of relationship scores as between the current scene and the plurality of relevant scenes based on the plurality of key phrases and the information associated with the plurality of relevant scenes; and
identify the related scene from the plurality of relevant scenes based on the plurality of relationship scores.

13. The system of claim 11, wherein the control circuitry is further configured, when displaying in the second display comprises, to:
identify the second display from a plurality of displays, wherein the second display is available to display the summary content;

determine a complementary audio level to apply to the second display, wherein the complementary audio level is determined to minimize audio disruptions to the continued display of the current scene on the first display;

direct the second display to playback the summary content at the same time as continued display of the current scene in the first display; and direct an audio system to playback audio associated with the summary content at the complementary audio level.

14. The system of claim 11, wherein the control circuitry is further configured to:

monitor an audio input device; and in response to receiving audio input, determine that the audio input indicates the summary command; and identify a plurality of candidate scenes;

present a list of the plurality of candidate scenes to the user; and receive, at the user equipment, a selection of one of the plurality of candidate scenes as the related scene.

15. The system of claim 14, wherein the control circuitry is further configured to weight the plurality of candidate scenes based on the comparison between the identifying information and the information associated with the plurality of relevant scenes.

16. The system of claim 11, wherein the control circuitry is further configured, when determining the related scene based on identifying information associated with the current scene and comparing the identifying information with information associated with the plurality of candidate scenes, to:

determine a portion of the current scene as an area of interest;

extract an object from the portion of the current scene;

generate a plurality of relationship scores as between the current scene and the plurality of relevant scenes based on information associated with the object and the information associated with the plurality of relevant scenes; and identify the related scene from the plurality of relevant scenes based on the plurality of relationship scores.

17. The system of claim 11, wherein the control circuitry is further configured to:

determine a second related scene from the plurality of relevant scenes;

extract one or more portions of the second related scene for inclusion in the summarized playback content; and combine the one or more portions of the first related scene, the one or more portions of the second related scene, and the one or more portions of the current scene for inclusion in the summarized playback content.

18. The system of claim 11, wherein the control circuitry is further configured to:

display a community interface in the second display;

receive information from a remote server for display in the second display;

receive input information from the community interface; and transmit the input information to the remote server.

19. The system of claim 11, wherein the control circuitry is further configured to:

receive, at a second playback position, a second summary command;

identify a second related scene related to the current scene at the second playback position;

determine, in response to the second summary command, that the second related scene is not available for summarized playback;

in response to determining that the second related scene is not available for summarized playback, request a remote summary of the second related scene from a remote server; and display the remote summary on the second display simultaneous with the continued display of the current scene in the first display.

20. The system of claim 11, wherein the control circuitry is further configured, when obtaining one or more portions of the related scene for inclusion in the summarized playback content, to:

identify that the related scene is available from a remote server;

request, from a remote server, the one or more portions of the related scene; and receive, from the remote server, the one or more portions of the related scene.

* * * * *